US012671302B2

(12) United States Patent
Sugimoto et al.

(10) Patent No.: US 12,671,302 B2
(45) Date of Patent: Jun. 30, 2026

(54) WIRE WINDING DEVICE AND WIRE WINDING METHOD

(71) Applicant: NITTOKU Co., Ltd., Saitama-city (JP)

(72) Inventors: Shinji Sugimoto, Nakatsugawa (JP); Takayuki Hasebe, Nakatsugawa (JP)

(73) Assignee: NITTOKU CO., LTD., Saitama-City (JP)

( * ) Notice: Subject to any disclaimer, the term of this patent is extended or adjusted under 35 U.S.C. 154(b) by 860 days.

(21) Appl. No.: 18/002,993

(22) PCT Filed: Jun. 30, 2021

(86) PCT No.: PCT/JP2021/024838
§ 371 (c)(1),
(2) Date: Dec. 22, 2022

(87) PCT Pub. No.: WO2022/009755
PCT Pub. Date: Jan. 13, 2022

(65) Prior Publication Data
US 2023/0253864 A1      Aug. 10, 2023

(30) Foreign Application Priority Data

Jul. 9, 2020      (JP) ................................. 2020-118466

(51) Int. Cl.
*B23P 19/00*      (2006.01)
*H02K 15/043*     (2025.01)
*H05K 13/04*      (2006.01)

(52) U.S. Cl.
CPC ............................... *H02K 15/0432* (2025.01)

(58) Field of Classification Search
CPC .. H02K 15/04; H02K 15/0432; H02K 15/062; H01F 41/06; H01F 41/071
See application file for complete search history.

(56) References Cited

U.S. PATENT DOCUMENTS

| | | | |
|---|---|---|---|
| 10,715,016 B2 * | 7/2020 | Tominaga | ................ H01F 41/08 |
| 10,792,724 B2 * | 10/2020 | Ishihara | .................. B21C 47/16 |
| 11,705,792 B2 * | 7/2023 | Sugimoto | ............ H02K 15/066 29/596 |

(Continued)

FOREIGN PATENT DOCUMENTS

| | | |
|---|---|---|
| EP | 2654050 A2 | 10/2013 |
| JP | S60257746 A | 12/1985 |

(Continued)

*Primary Examiner* — Paul D Kim
(74) *Attorney, Agent, or Firm* — Rabin & Berdo, P.C.

(57) ABSTRACT

A wire winding device includes: a rotary plate rotationally driven by a electric motor; a pair of columnar members provided on the rotary plate such that a rotation center axis of the rotary plate is positioned between the columnar members; the winding core respectively attached to the pair of columnar members; and a holding mechanism capable of changing and holding a gap distance between the pair of columnar members, the pair of columnar members are respectively provided on the rotary plate so as to be movable along a straight line, the straight line extending orthogonal to the rotation center axis of the rotary plate, and respective distances from the rotation center axis of the rotary plate to the pair of columnar members are held by the holding mechanism so as to become the same.

5 Claims, 14 Drawing Sheets

(56) References Cited

U.S. PATENT DOCUMENTS

2013/0277493 A1   10/2013  Yamaguchi
2019/0115813 A1    4/2019  Tominaga et al.

FOREIGN PATENT DOCUMENTS

JP        2000-245120  A    9/2000
JP        2018-064404  A    4/2018
JP        2018-082554  A    5/2018

* cited by examiner

WIRE WINDING DEVICE AND WIRE WINDING METHOD

TECHNICAL FIELD

The present invention relates to a wire winding device and a wire winding method.

BACKGROUND ART

A stator of a conventional power generator or a motor includes a cylinder shaped stator core having a plurality of teeth (magnetic poles) that are arranged in a radiating pattern so as to project radially inward directions and a plurality of slots that respectively open between the teeth; and stator coils that are assembled to the stator core by being received in the slots at coil side portions thereof. For the assembly of the stator coils, a so-called inserter method in which the stator coils are formed separately from the stator core in advance, and thereafter, the coils are inserted into the respective slots of the core is known (for example, see JP2000-245120A).

In a case in which the coil used for the inserter method is to be formed by winding a wire rod by a wire winding device, in order to set a resistance value of the coil so as to fall within a range of a designed value for a power generator or a motor, an overall length of the wire rod is increased/reduced by extending/shortening a length of a portion (a coil end) of the coil projecting out from an end surface of the stator core, and thereby, the resistance value of the coil is adjusted so as to fall within the range of the designed value.

In addition, because there are variations in the wire rod within the specification, for example, the resistance value of the coil may be changed even if the wire rod formed in the same period is used. Therefore, in the wire winding device, a tension of the wire rod is changed according to the designed value for the resistance value of the coil. However, in a case in which the resistance of the wire rod is changed greatly, the resistance value of the coil cannot be adjusted to the designed value only by adjusting the tension of the wire rod, and there may be a case in which the length of the wire rod to be wound around the winding core needs to be changed by changing the external shape of the winding core around which the wire rod is to be wound.

SUMMARY OF INVENTION

In the case in which the external shape of the winding core is to be changed, it is required to prepare a plurality of winding cores with different external shapes and to exchange the already-attached winding core with other winding core. However, because a wire winding position is changed when the winding core is exchanged, in a case in which a regular winding is to be performed, it is required to perform a wire winding adjustment by, for example, changing a wire winding program every time the winding core is exchanged, and so, it takes a relatively long time to perform the wire winding adjustment.

An object of the present invention is to provide a wire winding device and a wire winding method capable of changing a length of a wire rod to be wound with ease.

According to one aspect of the present invention, a wire winding device configured to wind a wire rod around a rotating winding core includes: a rotary plate rotationally driven by a driving mechanism; a pair of columnar members provided on the rotary plate such that a rotation center axis of the rotary plate is positioned between the columnar members; the winding core respectively attached to the pair of columnar members; and a holding mechanism capable of changing and holding a gap distance between the pair of columnar members, the pair of columnar members are respectively provided on the rotary plate so as to be movable along a straight line, the straight line extending orthogonal to the rotation center axis of the rotary plate, and respective distances from the rotation center axis of the rotary plate to the pair of columnar members are held by the holding mechanism so as to become the same.

According to another aspect of the present invention, a wire winding method for performing a wire winding by using a device having: a rotary plate rotationally driven by a driving mechanism; a pair of columnar members respectively provided on the rotary plate so as to be movable along a straight line, the straight line extending orthogonal to a rotation center axis of the rotary plate; and winding cores respectively attached to the pair of columnar members, the method includes: a step of adjusting a gap distance between the pair of columnar members, and a subsequent step of, while holding respective distances from the rotation center axis of the rotary plate to the pair of columnar members so as to become same with each other, winding a wire rod around the winding cores by rotating the rotary plate, the winding cores being rotated together with the pair of columnar members.

DESCRIPTION OF EMBODIMENTS

In the following, a wire winding device 20 according to this embodiment will be described with reference to the drawings.

FIGS. 1 to 7 show the wire winding device 20 according to this embodiment. In the figures, three axes X, Y, and Z that are mutually orthogonal are set. The X axis extends in the horizontal transverse direction, the Y axis extends in the horizontal front-rear direction, and the Z axis extends in the vertical direction.

The wire winding device 20 forms a stator coil 12 (see FIG. 14) that is used for a stator of a three-phase AC power generator (not shown). The wire winding device 20 is suitable for forming the stator coil 12 that is effective in a case in which the coil side portions 13a, 14a, and 15a of the stator coil 12 (see FIG. 14) are respectively inserted to slots of the stator (not shown).

The stator coil 12 forms a single winding wire layer. The stator coil 12 is formed such that the coil side portions 13a, 14a, and 15a (see FIG. 14) are respectively inserted to three adjacent slots of the stator (not shown), and the stator coil 12 has large-, medium-, and small-sized three continuous coils 13, 14, and 15 having different gap distances between the coil side portions.

Figure 1:
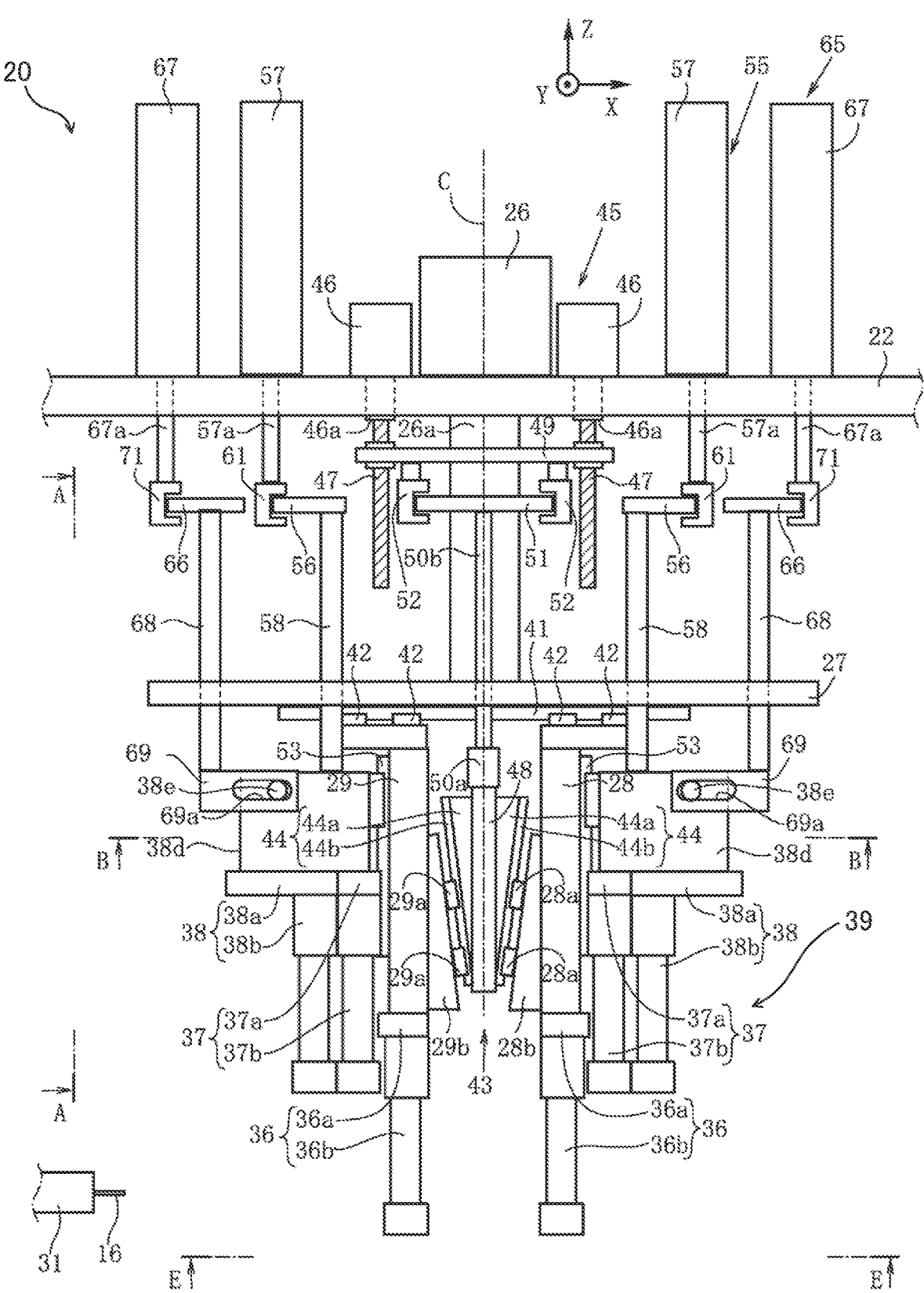
FIG. 1 is an enlarged front view of a winding core portion of a wire winding device in this embodiment.
Figure 7:
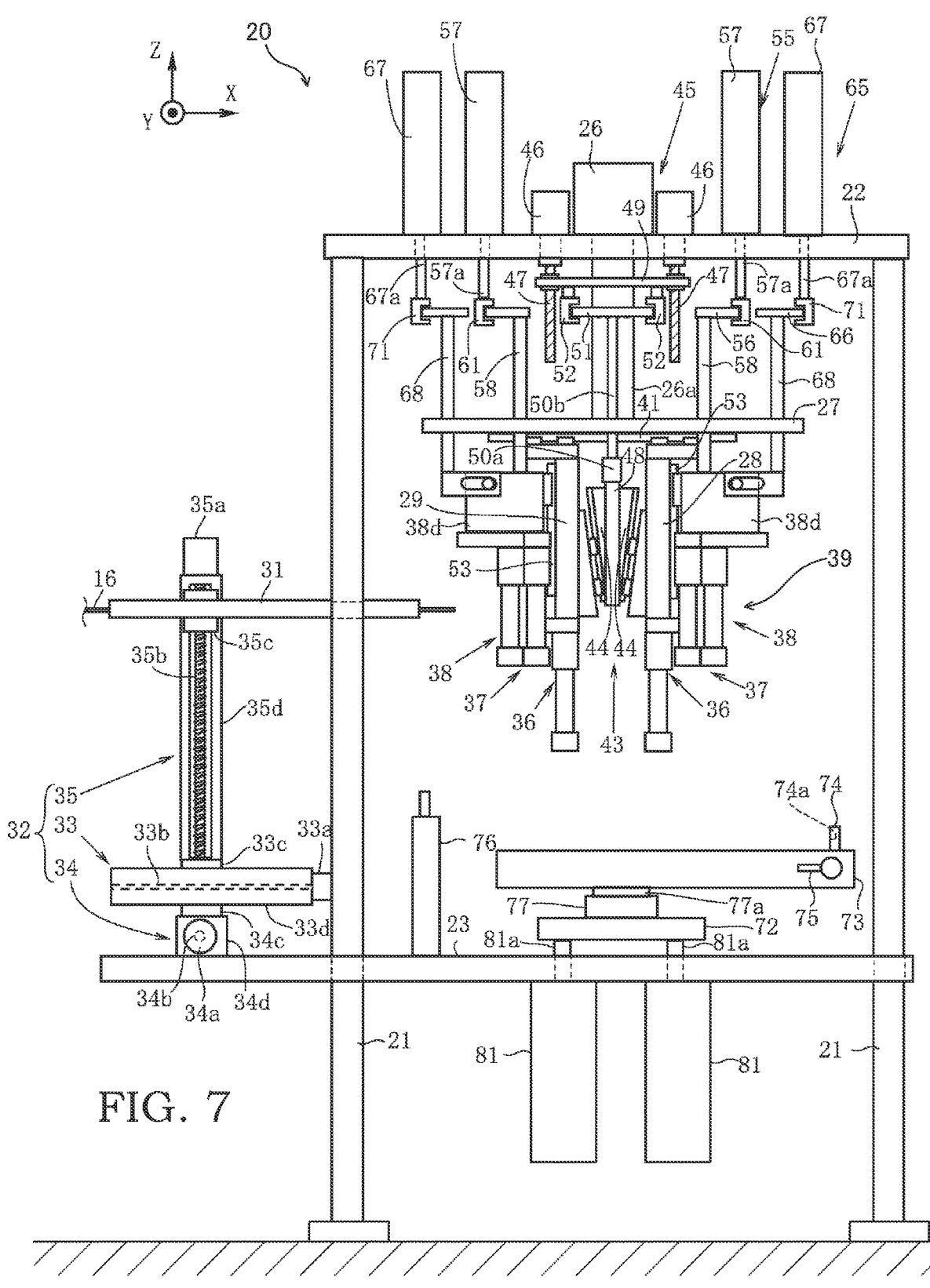
FIG. 7 is a front view of the wire winding device in this embodiment.

As shown in FIGS. 1 and 7, the wire winding device 20 is provided with: a rotary plate 27 that is rotationally driven by an electric motor 26 serving as a driving mechanism; a pair of columnar members 28 and 29 that are provided on the rotary plate 27 such that a rotation center axis C of the rotary plate 27 is positioned therebetween; and winding cores 39 that are respectively attached to the pair of columnar members 28 and 29. The wire winding device 20 forms the stator coil 12 (see FIG. 14) by winding a wire rod 16 around the winding cores 39 that are rotated by the electric motor 26 together with the pair of columnar members 28 and 29.

As the wire rod 16, a sheathed conductor, a so-called round wire having a circular cross-section is used. The wire rod 16 may be a so-called rectangular wire having a rectangular cross-section. The wire rod 16 is delivered from a wire rod delivering member 31.

The wire rod 16 is stored by being wound around a spool (not shown). The wire rod 16 that has been drawn out from the spool is stretched straight by a stretcher (not shown), and then, guided to the wire rod delivering member 31.

As shown in FIG. 7, the wire rod delivering member 31 is a rod-shaped member in which a hole for passing through the wire rod 16 is formed. The wire rod delivering member 31 is attached to a lower table 23 via a wire rod delivering member moving mechanism 32 that is capable of moving the wire rod delivering member 31 in the three axial directions.

The wire rod delivering member moving mechanism 32 has X axis, Y axis, and Z axis direction extension/contraction actuators 33 to 35. The extension/contraction actuators 33 to 35 respectively have ball screws 33b to 35b that are rotationally driven by servomotors 33a to 35a, and followers 33c to 35c that are respectively screwed to the ball screws 33b to 35b so as to be moved in parallel therewith.

In the Z axis direction extension/contraction actuator 35, the follower 35c can be moved in the vertical direction, and a housing 35d is attached to the follower 33c of the X axis direction extension/contraction actuator 33. In the X axis direction extension/contraction actuator 33, the follower 33c can be moved in the X axis direction, and a housing 33d is attached to the follower 34c of the Y axis direction extension/contraction actuator 34.

In the Y axis direction extension/contraction actuator 34, the follower 34c can be moved in the Y axis direction, and a housing 34d extends in the Y axis direction and is attached to the lower table 23. The wire rod delivering member 31 extends in the X axis direction and is attached to the follower 35c of the Z axis direction extension/contraction actuator 35.

A biting mechanism (not shown) that bites and holds the wire rod 16 that is delivered from the wire rod delivering member 31 is provided on the wire rod delivering member 31.

As shown in FIG. 1, the rotary plate 27 is configured so as to be rotated in the horizontal plane by being attached such that the center thereof is coaxial with a rotation axis 26a of the electric motor 26. In addition, the pair of columnar members 28 and 29 are provided on the rotary plate 27 such that the rotation center axis C of the rotary plate 27 is positioned therebetween. The pair of columnar members 28 and 29 are each provided on the rotary plate 27 so as to be movable along the straight line intersecting the rotation center axis C of the rotary plate 27. Specifically, the pair of columnar members 28 and 29 are each movable along the straight line orthogonal with the rotation center axis C of the rotary plate 27.

The rotary plate 27 is a circular plate, and the rotation axis 26a of the electric motor 26 is attached to the center of the rotary plate 27 in a state in which the rotary plate 27 is arranged horizontally. On a lower surface of the rotary plate 27, rails 41 are attached so as to be orthogonal with the rotation center axis C.

The pair of columnar members 28 and 29 are provided so as to extend in parallel with the rotation center axis C of the rotary plate 27 extending in the vertical direction, and moving blocks 42 are respectively attached to top parts of the pair of columnar members 28 and 29 by being engaged with the rails 41 so as to be reciprocatingly movable in the longitudinal direction of the rails 41. Because the moving blocks 42 are movably engaged with the rails 41, the pair of columnar members 28 and 29 are respectively provided so as to be movable along the straight line intersecting the rotation center axis C of the rotary plate 27.

The wire winding device 20 is further provided with a holding mechanism 43 that is capable of changing and holding the gap distance between the pair of columnar members 28 and 29. The respective distances from the rotation center axis C of the rotary plate 27 to the pair of columnar members 28 and 29 are held by the holding mechanism 43 so as to become the same with each other.

The holding mechanism 43 has: a movable plate 48 that is provided on the rotation center axis C of the rotary plate 27 so as to be movable along the direction of the rotation center axis C of the rotary plate 27; a pair of wedge members 44 and 44 that are provided on both side surfaces of the movable plate 48 such that the rotation center axis C of the rotary plate 27 is positioned therebetween, the pair of wedge members 44 and 44 respectively having inclined surfaces opposing the pair of columnar members 28 and 29; and a wedge moving mechanism 45 that moves, together with the movable plate 48, the pair of wedge members 44 and 44 along the direction of the rotation center axis C of the rotary plate 27.

Figure 5:
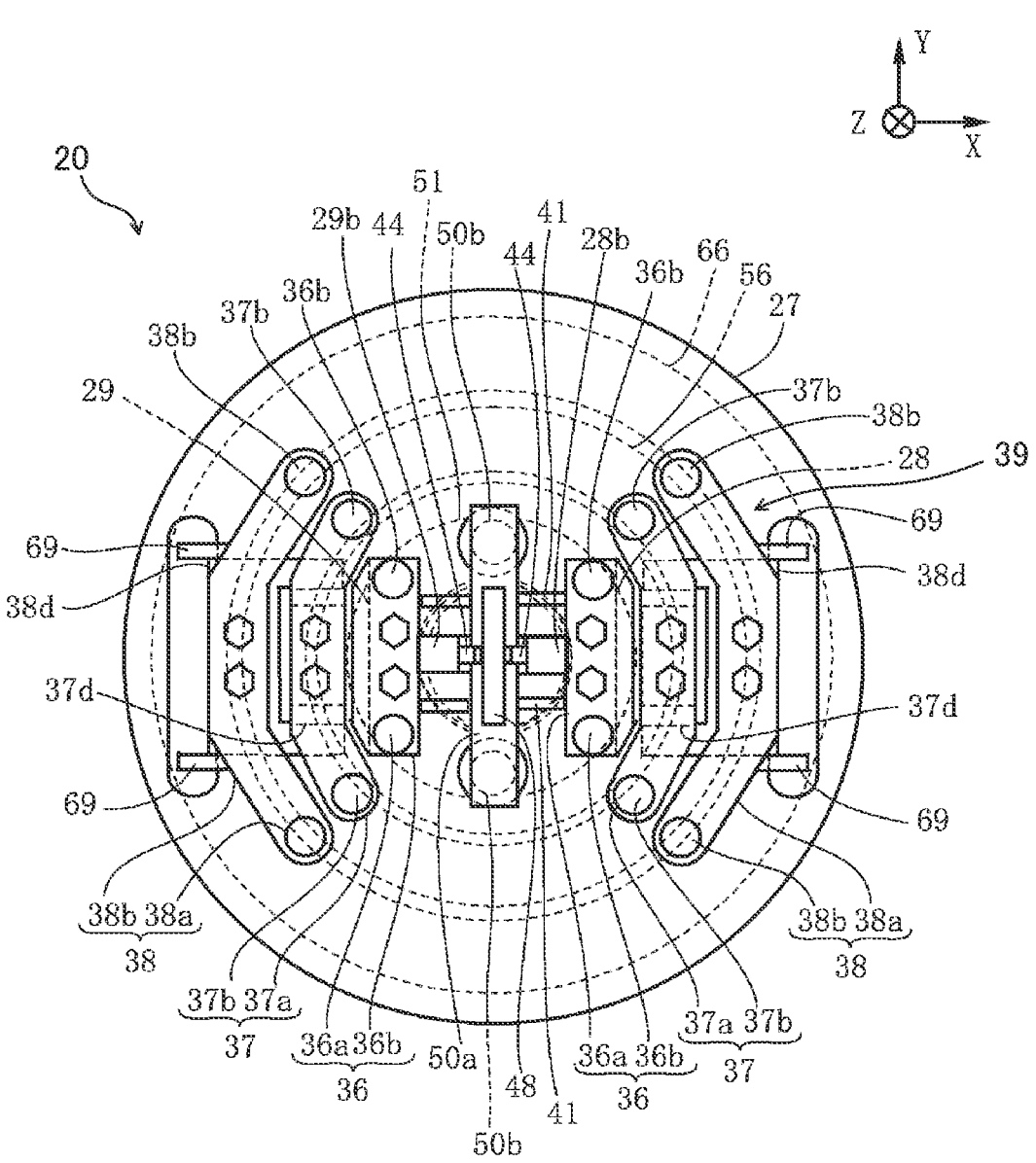
FIG. 5 is a sectional view taken along line E-E in FIG. 1.

As shown in FIGS. 1 and 5, a lateral member 50a extending in the radial direction of the rotary plate 27 is provided on an upper end of the movable plate 48, on both sides of which the pair of wedge members 44 and 44 are attached, and a lower end of a longitudinal member 50b, which is movable through the rotary plate 27, is attached to both ends of the lateral member 50a. To an upper end of the longitudinal member 50b projecting out above the rotary plate 27, an annular ring shaped operation plate 51 surrounding the rotation axis 26a of the electric motor 26 is attached so as to be coaxial with the rotation axis 26a.

As shown in FIG. 7, a plurality of posts 21, which are provided so as to surround the rotary plate 27, support the lower table 23 and support an upper table 22 in a horizontal manner above the rotary plate 27. The electric motor 26 is attached to the upper table 22 such that the rotation axis 26a is directed downward.

Figure 2:
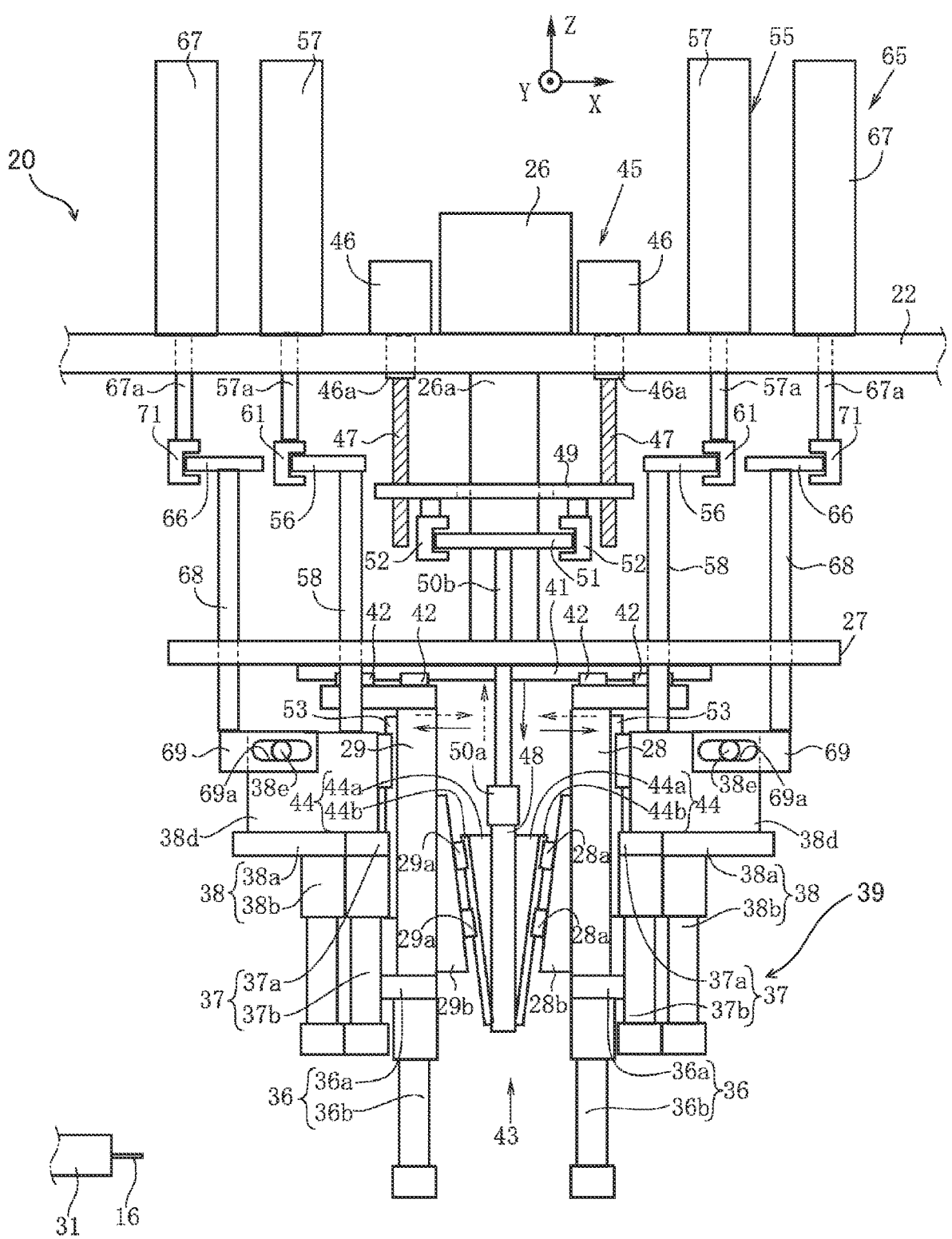
FIG. 2 is an enlarged front view of the winding core portion of the wire winding device in this embodiment and shows a state in which a gap distance between a pair of columnar members is increased.
Figure 3:
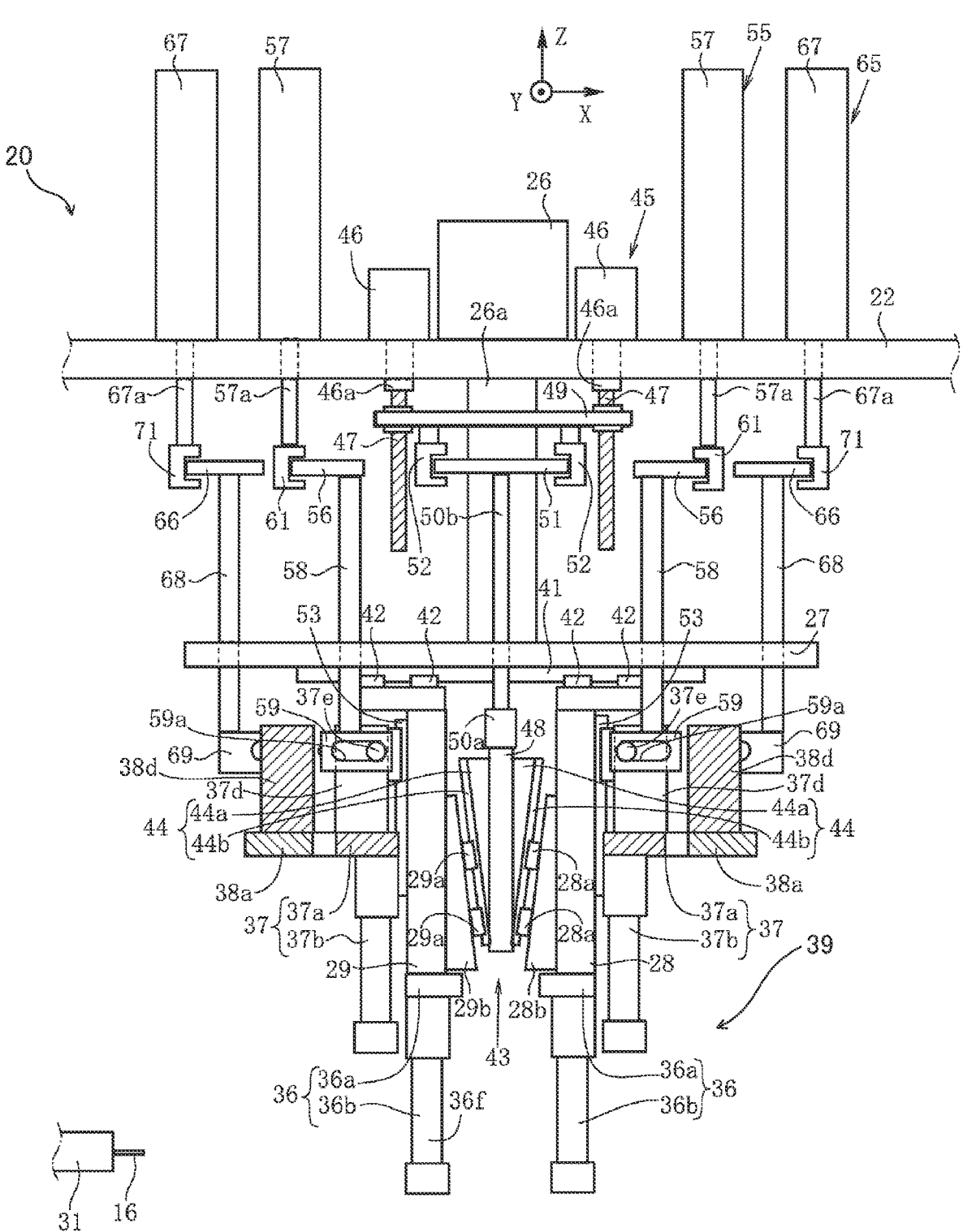
FIG. 3 is a diagram showing a first winding-core moving mechanism, and is a sectional view taken along line C-C in FIG. 6.
Figure 4:
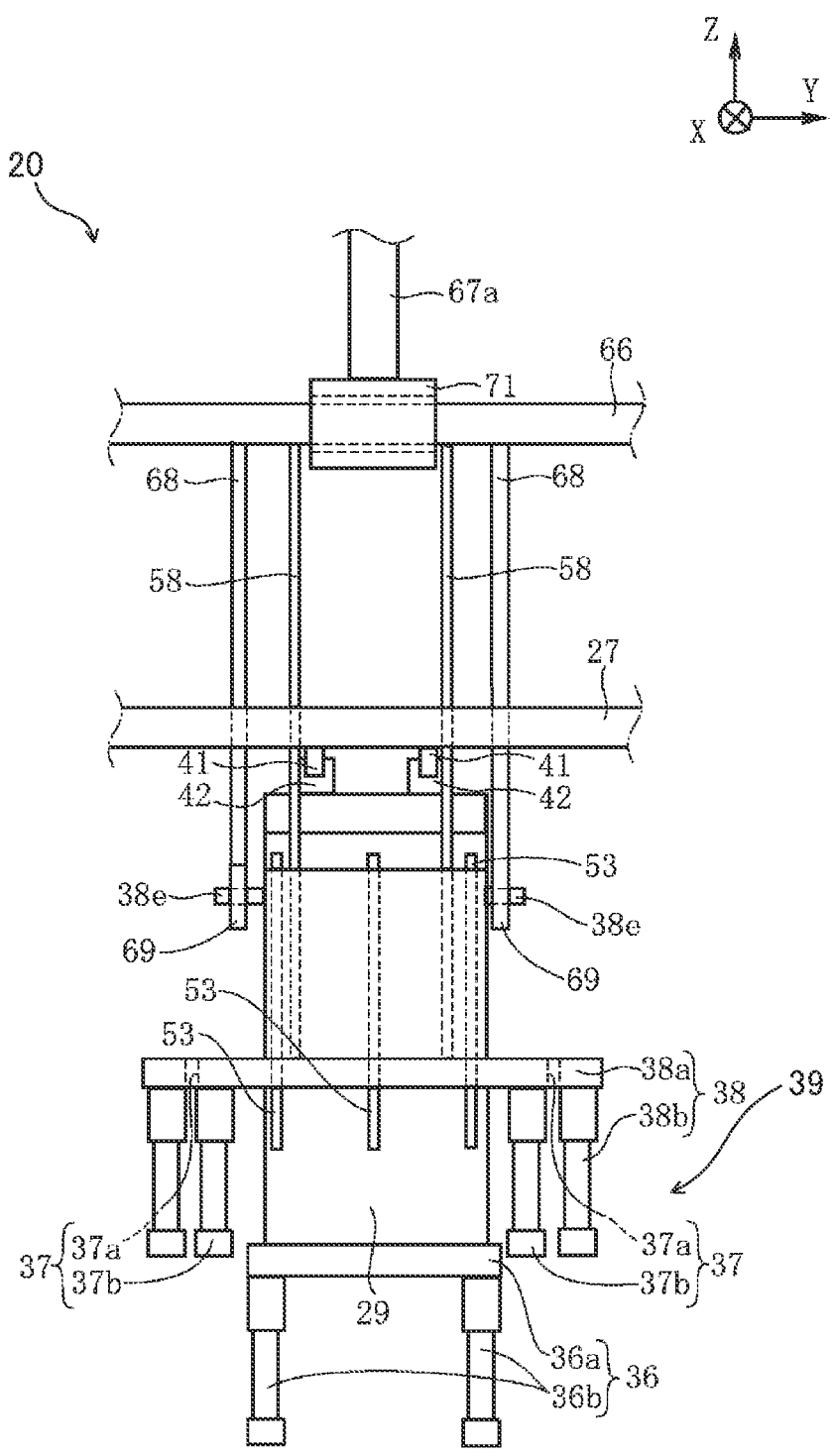
FIG. 4 is a sectional view taken along line A-A in FIG. 1.

As shown in FIGS. 1 to 3, control motors 46 configuring the wedge moving mechanism 45 are provided on an upper surface of the upper table 22. The control motors 46 can adjust the rotation speed of rotation axes 46a and a pair of control motors 46 are provided such that the electric motor 26 is positioned therebetween and such that the rotation axes 46a are directed downward. The rotation axes 46a are each formed with an external thread 47. In addition, an annular ring shaped control member 49 surrounding the rotation axis 26a of the electric motor 26 is provided above the operation plate 51 so as to be coaxial with and in parallel with the operation plate 51. The control member 49 is linked to the movable plate 48 by being threaded to the external threads 47.

The control member 49 is provided with engagement members 52 that engage with a periphery of the operation plate 51. As the control motors 46 are driven and the external threads 47 are rotated, the control member 49, to which the external threads 47 are threaded, is moved upward and downward in the direction along the rotation center axis C of the rotary plate 27 (the Z axis direction) by an amount corresponding to the number of rotation of the external threads 47. With such a configuration, the engagement members 52 are moved upward and downward together with the control member 49.

As the engagement members 52 are moved upward and downward together with the control member 49, the operation plate 51 is moved upward and downward together with the movable plate 48 via the engagement members 52. With such a configuration, the pair of wedge members 44 and 44 provided on both sides of the movable plate 48 are respectively moved upward and downward at the same time, in the same direction, and at the same speed. As described above, as the control member 49 is moved in response to the rotation of the control motors 46, the pair of wedge members 44 and 44 can be moved together with the movable plate 48 along the direction of the rotation center axis C of the rotary plate 27.

The pair of wedge members 44 and 44 are arranged on the movable plate 48 in a symmetrical manner such that the rotation center axis C of the rotary plate 27 is positioned between the pair of wedge members 44 and 44.

The wedge members 44 each has a triangle plate 44a serving as an inclined member having the inclined surface and a rail 44b that is provided on the inclined surface. The triangle plate 44a extends in the direction of the rotation center axis C of the rotary plate 27 and is attached to the movable plate 48 such that the inclined surface faces one of the pair of columnar members 28 and 29. In other words, the pair of wedge members 44 and 44 are configured of the pair of triangle plates 44a and 44a and the pair of rails 44b and 44b, and the inclined surfaces of the pair of triangle plates 44a and 44a respectively face the pair of columnar members 28 and 29. The inclined surfaces of the pair of triangle plates 44a and 44a are formed so as to, toward the upper end of the movable plate 48, spread radially outward of the rotary plate 27 from the movable plate 48 and so as to come close to each other toward a lower end of the movable plate 48. In addition, the pair of rails 44b and 44b are respectively provided so as to extend along the inclined surfaces of the pair of triangle plates 44a and 44a. Moving blocks 28a and 29a, each serving as a follower member that is movable along the extending direction of the rails 44b, are respectively attached to the pair of columnar members 28 and 29 via auxiliary plates 28b and 29b. The moving blocks 28a and 29a are respectively fixed to the pair of columnar members 28 and 29 via the auxiliary plates 28b and 29b so as not be movable.

With such a configuration, as the control motors 46 are driven and the movable plate 48 is moved in the vertical direction together with the pair of wedge members 44 and 44, the moving blocks 28a and 29a are moved in the radial direction of the rotary plate 27 by following the inclination of the rails 44b. Thus, the pair of columnar members 28 and 29, to which the moving blocks 28a and 29a are fixed, are moved in the radial direction of the rotary plate 27, and thereby, the gap distance between the pair of columnar members 28 and 29 is changed.

For example, from a state shown in FIG. 1 in which the movable plate 48 has moved up, as the movable plate 48 is moved downward as indicated by a solid arrow in FIG. 2, the moving blocks 28a and 29a are moved upwards towards the upper end of the movable plate 48. Because the pair of rails 44b and 44b are formed so as to spread out radially outward of the rotary plate 27 from the movable plate 48 towards the upper end of the movable plate 48, the moving blocks 28a and 29a and the pair of columnar members 28 and 29 are moved radially outward of the rotary plate 27. Thus, the gap distance between the pair of columnar members 28 and 29 is increased. Conversely, as the movable plate 48 is moved upward as indicated by a broken arrow in FIG. 2, the moving blocks 28a and 29a are moved downward towards the lower end of the movable plate 48. Thus, the gap distance between the pair of columnar members 28 and 29 is reduced.

In addition, because the movable plate 48 is provided on the rotation center axis C and the pair of wedge members 44 and 44 have a symmetrical configuration, the respective distances from the rotation center axis C of the rotary plate 27 to the pair of columnar members 28 and 29 become the same. As upward and downward movement of the movable plate 48 by the control motors 46 is stopped, the movements of the pair of columnar members 28 and 29 are also stopped, and so, the gap distance between the pair of columnar members 28 and 29 is held at a predetermined value.

In addition, the engagement members 52 engage with the periphery of the operation plate 51 to prohibit the upward and downward movement of the operation plate 51 in an independent manner, however, the engagement members 52 allow the operation plate 51 to be rotated. Thus, the rotation of the operation plate 51 together with the rotary plate 27 is not inhibited by the engagement members 52. In addition, the winding cores 39 are respectively attached to the pair of columnar members 28 and 29.

The winding cores 39 have inner winding cores 36 that are respectively attached to tip ends of the pair of columnar members 28 and 29 and first outer winding cores 37 and second outer winding cores 38 serving as outer winding cores that are respectively arranged radially outward of the inner winding cores 36.

As shown in FIGS. 1 to 5, the inner winding cores 36 are respectively attached to the lower ends of the pair of columnar members 28 and 29. The inner winding cores 36 are provided with inner base plates 36a that are respectively attached to the lower ends of the pair of columnar members 28 and 29 in a horizontal manner and a plurality of inner suspending pins 36b that are respectively provided on the inner base plates 36a for forming the inner coil 13 by suspending the wire rod 16 (see FIG. 12).

The plurality of inner suspending pins 36b are provided on the inner base plate 36a so as to project downward from a lower surface of the inner base plates 36a in accordance with the shape of the inner coil 13. In this embodiment, the pair of inner base plates 36a are each provided with two inner suspending pins 36b, and total of four inner suspending pins 36b are provided along an inner circumference of the shape of the rectangular inner coil 13 to be formed (see FIG. 12).

Figure 9:
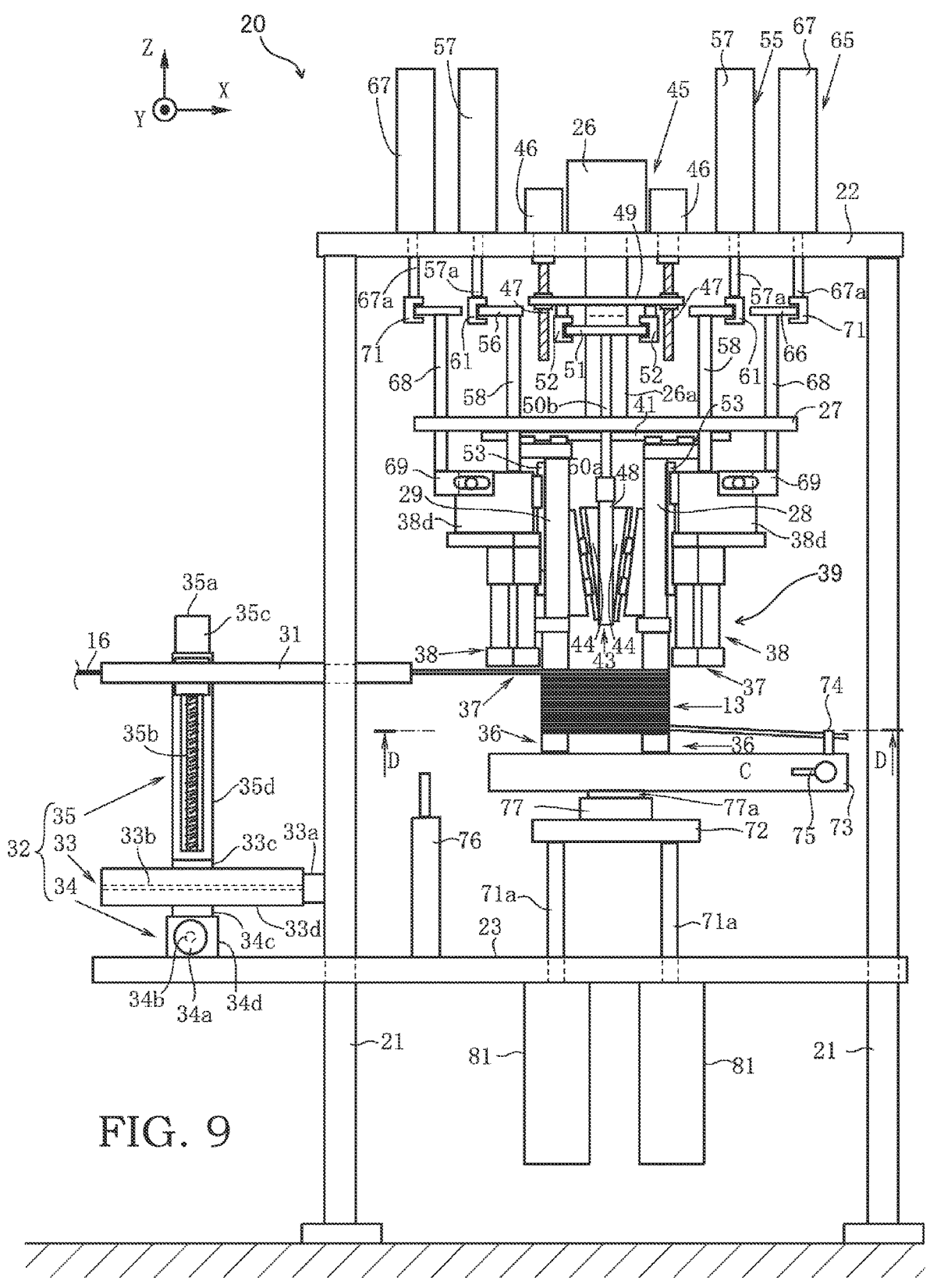
FIG. 9 is a front view of the wire winding device in this embodiment and shows a state in which an inner coil is formed by winding the wire rod around inner winding cores.
Figure 12:
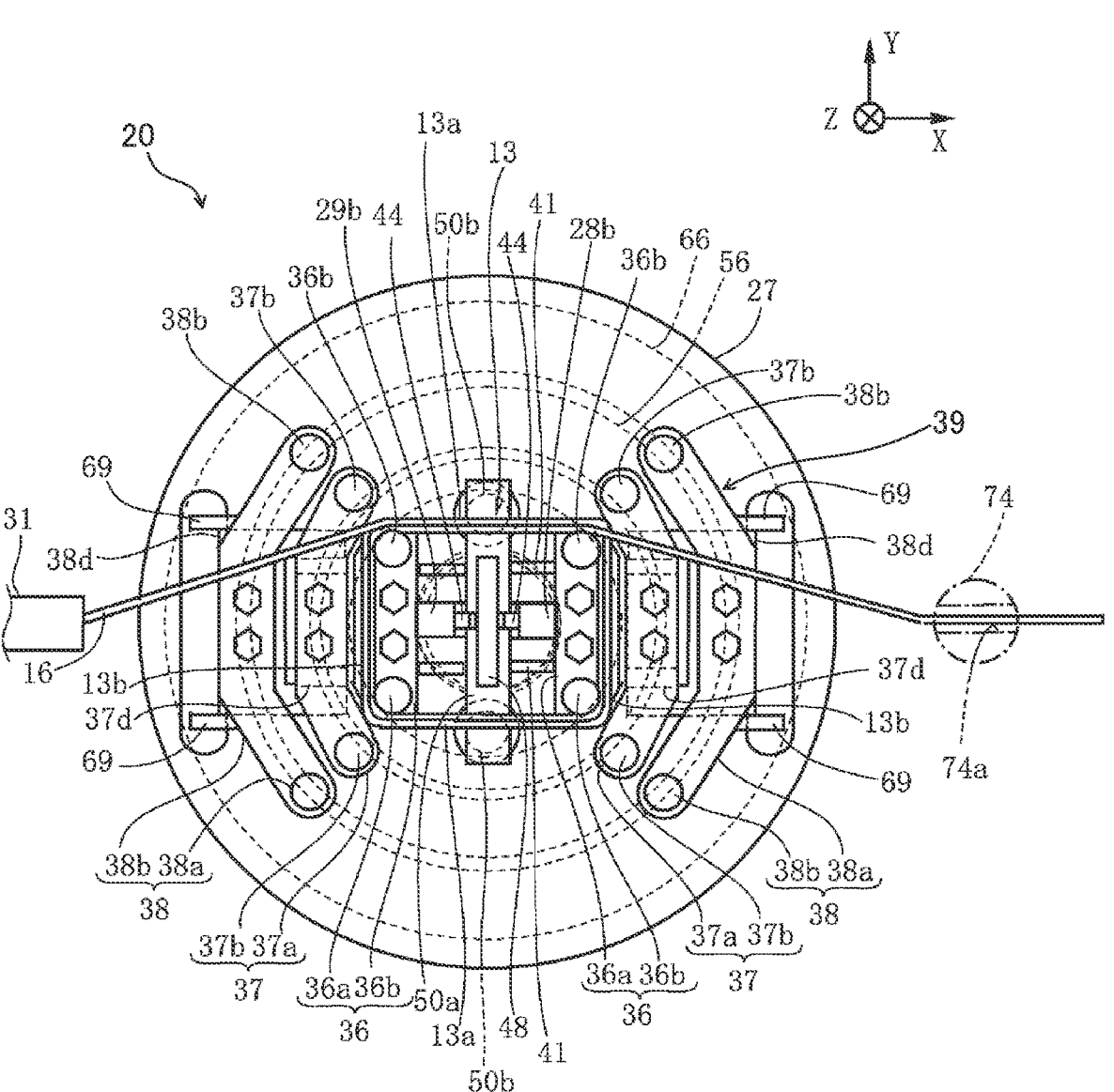
FIG. 12 is a sectional view taken along line D-D in FIG. 9.

Thus, by winding the wire rod 16 around the plurality of (four) inner suspending pins 36b by rotating the pair of columnar members 28 and 29 together with the inner winding cores 36, as shown in FIGS. 9 and 12, the wire rod 16 suspended around the respective inner suspending pins 36b forms coil end portions 13b of the inner coil 13. In addition, the wire rod 16 suspended between the pair of columnar members 28 and 29 forms the coil side portions 13a of the inner coil 13.

Figure 13:
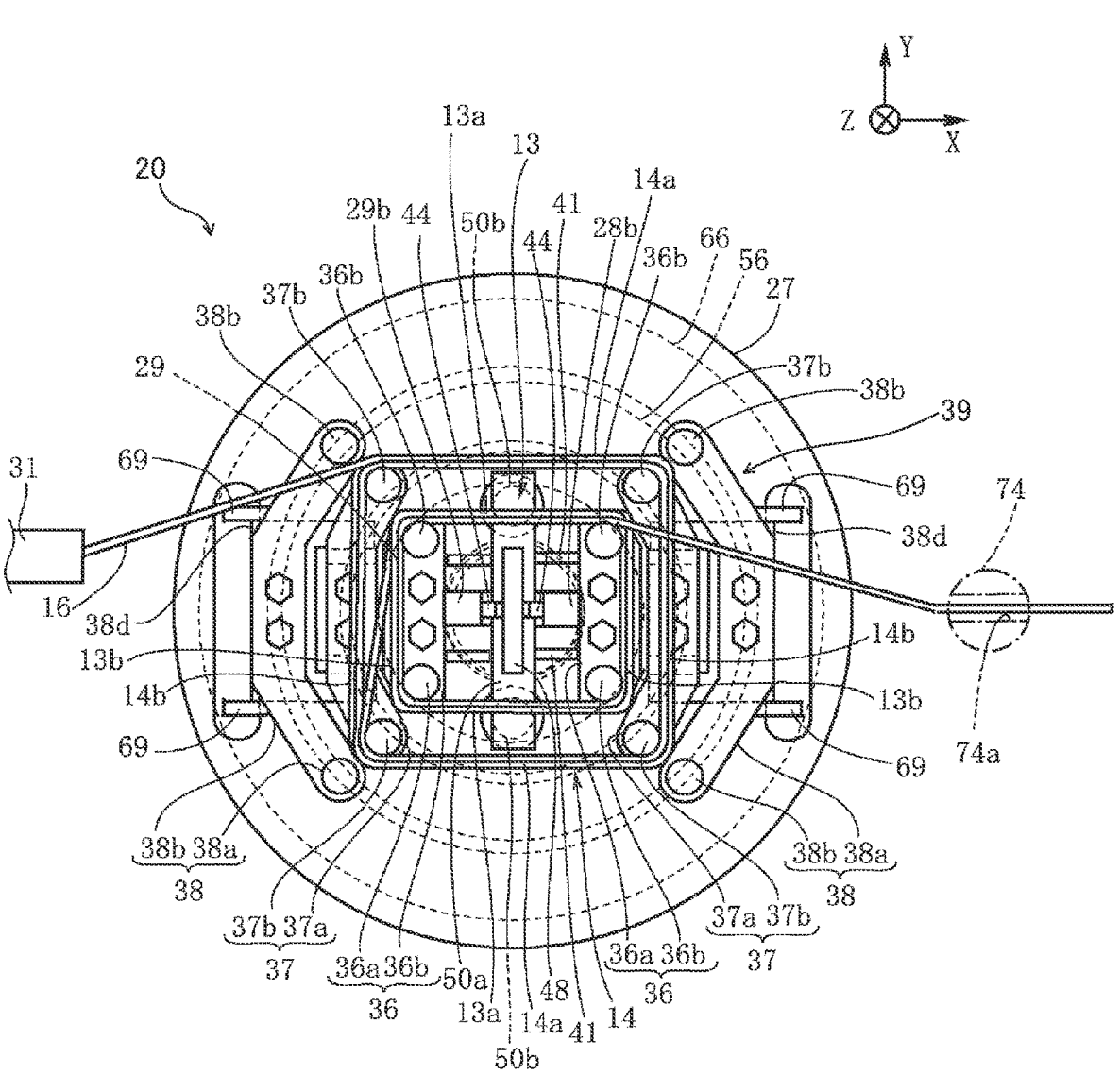
FIG. 13 is a sectional view taken along line F-F in FIG. 10.

The first outer winding cores 37 are provided for forming the intermediate coil 14 surrounding the inner coil 13 (see FIG. 13). As shown in FIGS. 1 and 5, the first outer winding cores 37 are arranged radially outer side of the inner base plates 36a, and the first outer winding cores 37 each has an intermediate base plate 37a that has a longer length in the circumferential direction than the inner base plate 36a and a plurality of intermediate suspending pins 37b that are provided on the intermediate base plate 37a for forming the intermediate coil 14 by suspending the wire rod 16.

Figure 14:
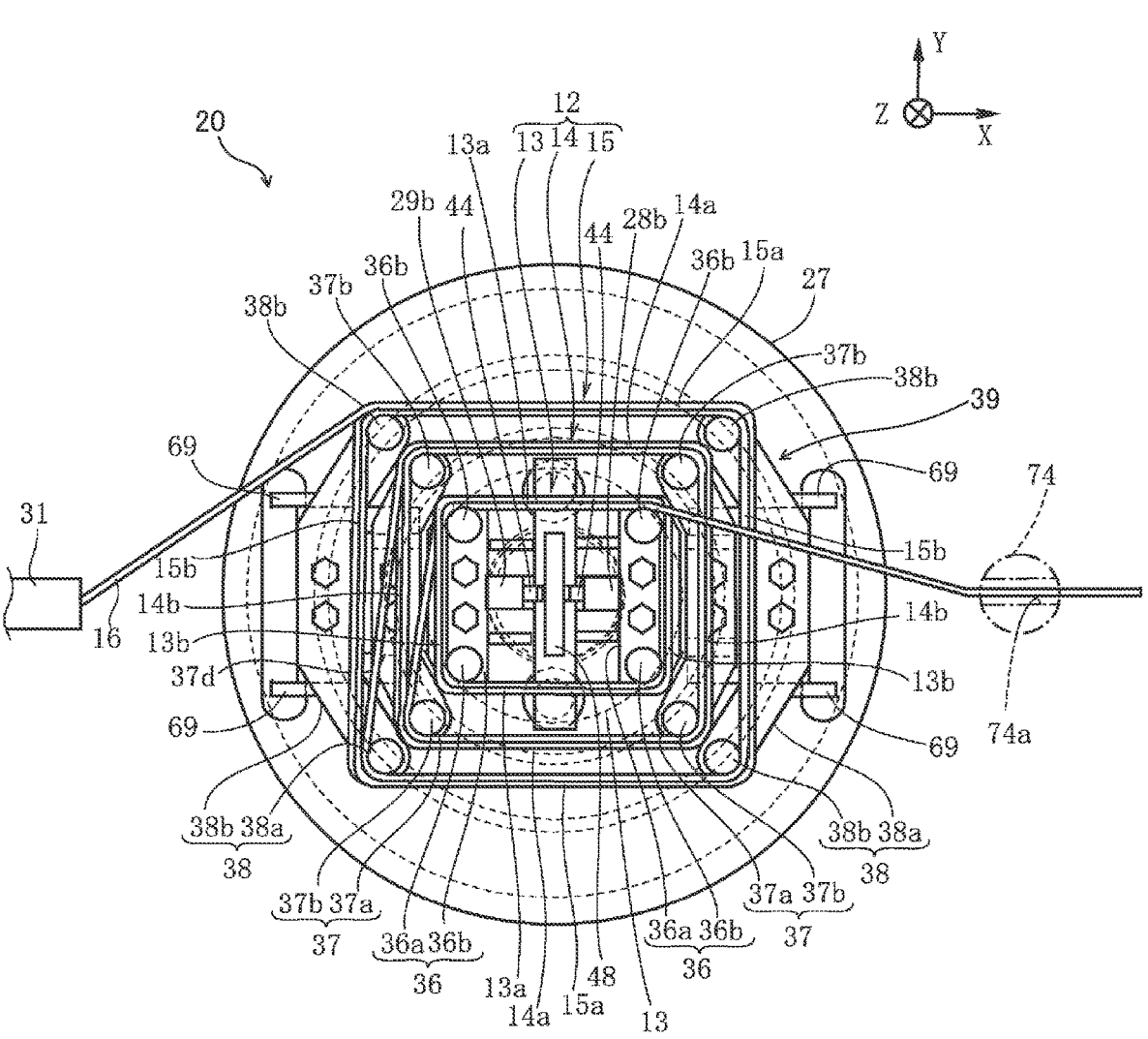
FIG. 14 is a sectional view taken along line G-G in FIG. 11.

In addition, the second outer winding cores 38 are provided for forming the outer coil 15 further surrounding the intermediate coil 14 (see FIG. 14). The second outer winding cores 38 are arranged radially outer side of the intermediate base plates 37a, and the second outer winding cores 38 each has an outer base plate 38a that has a longer length in the circumferential direction than the intermediate base plate 37a and a plurality of outer suspending pins 38b that are provided on the outer base plate 38a for forming the outer coil 15 by suspending the wire rod 16.

As shown in FIGS. 1 to 7, the first outer winding cores 37 and the second outer winding cores 38 are respectively provided on the pair of columnar members 28 and 29 so as to be movable. A plurality of rails 53 extending in the vertical direction in parallel with the rotation center axis C of the rotary plate 27 are respectively provided on the pair of columnar members 28 and 29.

Figure 6:
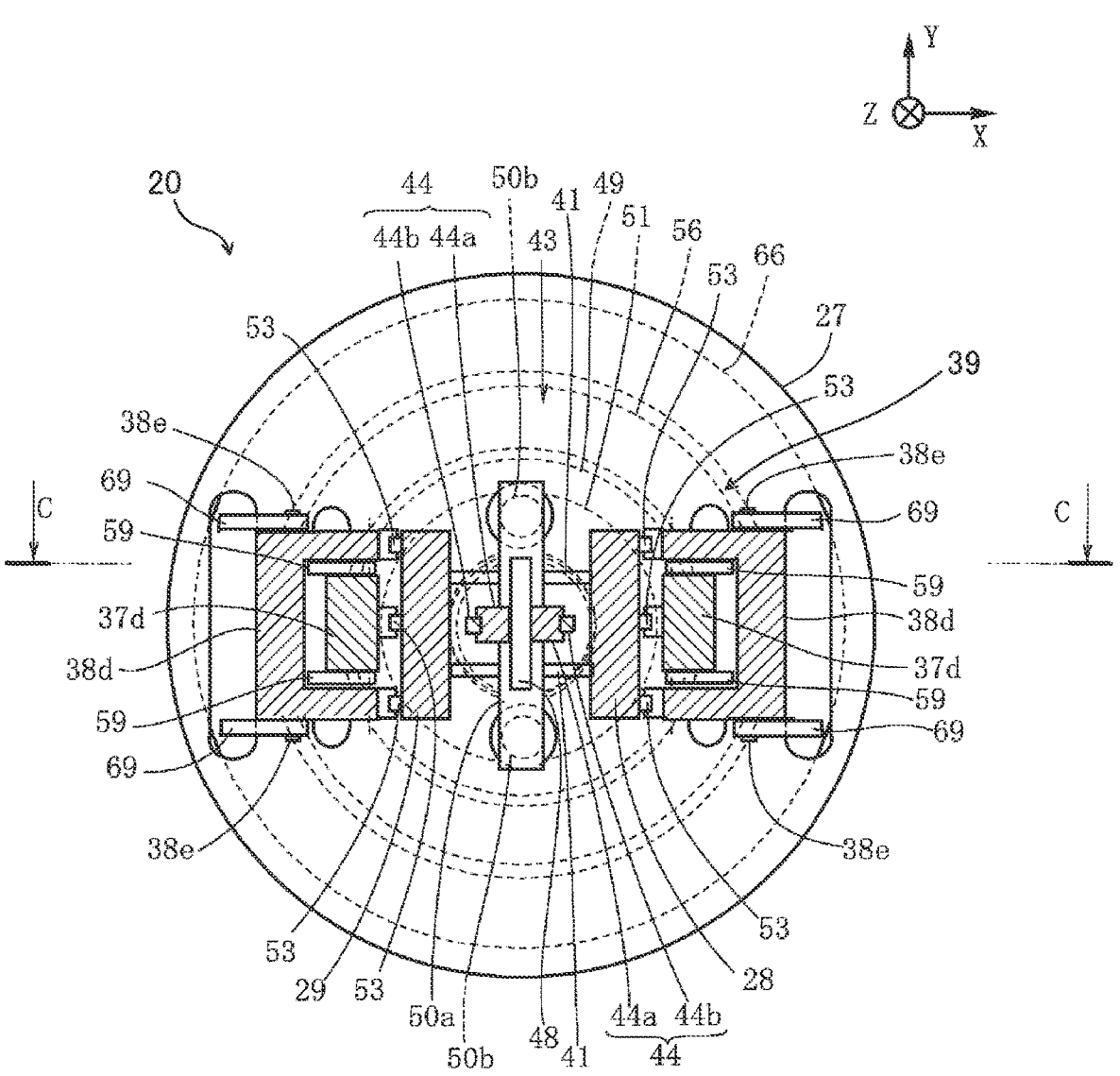
FIG. 6 is a sectional view taken along line B-B in FIG. 1.

As shown in FIGS. 3 and 6, the intermediate base plates 37a are each attached to an intermediate movable body 37d that is attached to the one of rails 53 so as to be movable upward and downward. The intermediate suspending pins 37b are provided on the intermediate base plate 37a so as to project downward from a lower surface of the intermediate base plates 37a in accordance with the shape of the intermediate coil 14 to be formed (see FIG. 13).

As shown in FIGS. 1, 2, and 6, the outer base plates 38a are each attached to an outer movable body 38d that is attached to the other of rails 53 so as to be movable upward and downward. The outer suspending pins 38b are provided on the outer base plate 38a so as to project downward from a lower surface of the outer base plates 38a in accordance with the shape of the outer coil 15 to be formed (see FIG. 14). As shown in FIG. 6, the outer movable body 38d has a U shaped cross-section in the X-Y plane and surrounds the intermediate movable body.

The plurality of intermediate suspending pins 37b and the outer suspending pins 38b are moved upward and downward together with the intermediate base plates 37a and the outer base plates 38a, respectively. In the direction of the rotation center axis C of the rotary plate 27, the intermediate suspending pins 37b and the outer suspending pins 38b are provided so as to be movable, in a reciprocating manner, between a winding position at which the wire rod 16 can be wound and a waiting position at which the wire rod 16 cannot be wound, the winding position being located at the same level as those of the inner suspending pins 36b as shown in FIG. 5, and the waiting position being located at the different level from those of the inner suspending pins 36b as shown in FIGS. 1 to 3.

As shown in FIGS. 1 to 3, the wire winding device 20 is provided with first and second winding core moving mechanisms 55 and 65 that are respectively capable of moving, in a reciprocating manner, the first outer winding cores 37 and the second outer winding cores 38 between the winding position and the waiting position. The first winding-core moving mechanism 55 and the second winding core moving mechanism 65 have the same configuration with each other. The first winding-core moving mechanism 55 and the second winding core moving mechanism 65 respectively have annular ring shaped plate members 56 and 66 that are positioned above the rotary plate 27 and linked with the first outer winding cores 37 and the second outer winding cores 38, respectively, and fluid pressure cylinders 57 and 67, each serving as an actuator, that are provided on the upper surface of the upper table 22 such that rods 57a and 67a extend downward.

Lifting and lowering rods 58 and 68 extending in the vertical direction are provided so as to penetrate through the rotary plate 27 in the axial direction. The lifting and lowering rods 58 and 68 are linked with the intermediate movable bodies 37d and the outer movable body 38d, respectively. Clamp plates 59 and 69 that respectively clamp the intermediate movable bodies 37d and the outer movable body 38d in the rotation direction of the rotary plate 27 (in the Y axis direction) are respectively attached to lower ends of the lifting and lowering rods 58 and 68.

Elongated holes 59a and 69a elongated in the radial direction of the rotary plate 27 (see FIGS. 1 and 3) are respectively formed in the clamp plates 59 and 69, and round pins 37e and 38e, which can enter the elongated holes 59a and 69a, are respectively provided on the intermediate movable bodies 37d and the outer movable body 38d. With such a configuration, the first outer winding cores 37 and the second outer winding cores 38 including the intermediate movable bodies 37d and the outer movable body 38d are prohibited from being moved upward and downward independently from the clamp plates 59 and 69. Furthermore, the first outer winding cores 37 and the second outer winding cores 38 are allowed to be moved together with the pair of columnar members 28 and 29 in the radial direction of the rotary plate 27 relative to the lifting and lowering rods 58 and 68.

The annular ring shaped plate members 56 and 66 that surround the rotation axis 26a of the electric motor 26 and the operation plate 51 in a coaxial manner are attached to upper ends of the lifting and lowering rods 58 and 68. Engagement members 61 and 71 that respectively engage with peripheries of the plate members 56 and 66 are provided on lower ends of the rods 57a and 67a of the fluid pressure cylinders 57 and 67.

As the rods 57a and 67a are pushed out and pulled in by the fluid pressure cylinders 57 and 67, the plate members 56 and 66 are moved upward and downward together with the first outer winding cores 37 and the second outer winding cores 38 via the engagement members 61 and 71 provided on the lower ends of the rods 57a and 67a. As described above, the first outer winding cores 37 and the second outer winding cores 38 are provided so as to be movable in a reciprocating manner between the winding position shown in FIG. 11 and the waiting position shown in FIG. 7.

In this configuration, the engagement members 61 and 71 engage with the peripheries of the plate members 56 and 66 to prohibit the independent upward and downward movement of the plate members 56 and 66. In addition, the engagement members 61 and 71 allow the rotation of the plate members 56 and 66 and the rotation of the rotary plate 27 together with the plate members 56 and 66.

Figure 10:
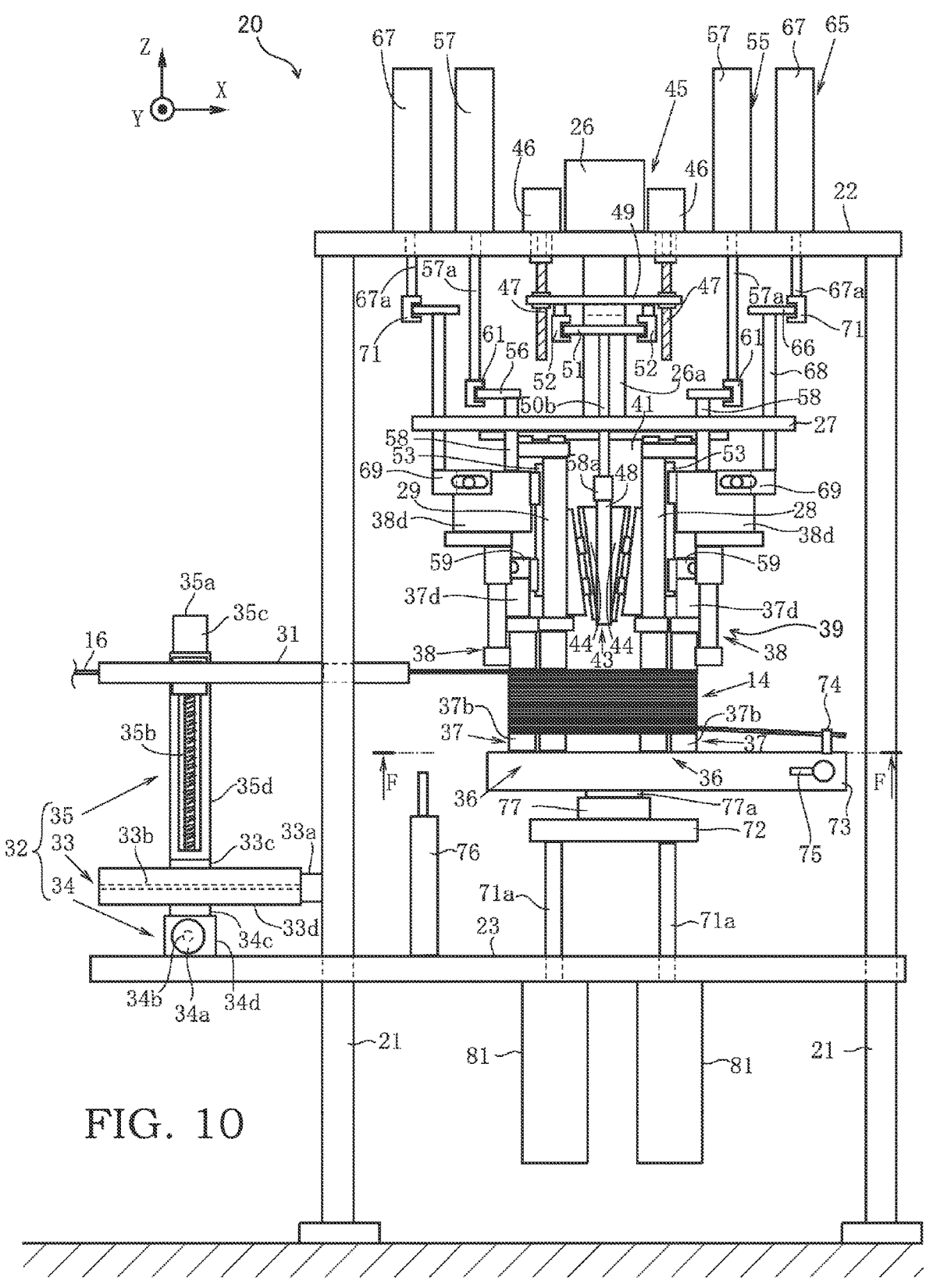
FIG. 10 is a front view of the wire winding device in this embodiment and shows a state in which an intermediate coil is formed by winding the wire rod around first outer winding cores.
Figure 11:
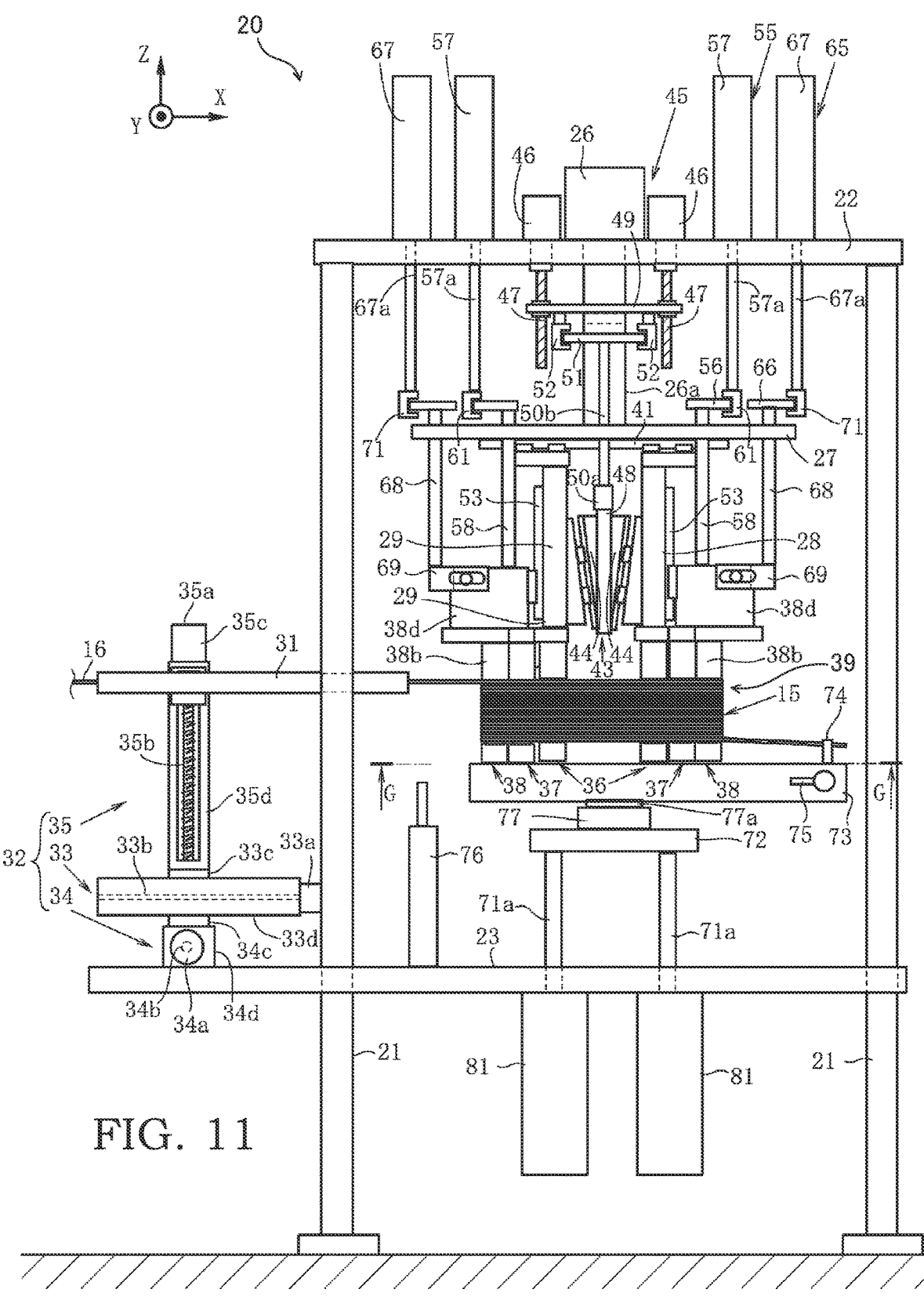
FIG. 11 is a front view of the wire winding device in this embodiment and shows a state in which an outer coil is formed by winding the wire rod around second outer winding cores.

Therefore, as shown in FIGS. 10 and 11, as the electric motor 26 is driven and the rotary plate 27 is rotated, the first outer winding cores 37 and the second outer winding cores 38 are rotated together with the pair of columnar members 28 and 29 provided on the rotary plate 27. Then, the wire rod 16 is wound around the respective intermediate suspending pins 37b and outer suspending pins 38b of the first outer winding cores 37 and the second outer winding cores 38.

As shown in FIG. 7, on the lower table 23 that is provided on the posts 21, which support the upper table 22, and that is supported horizontally below the pair of columnar members 28 and 29, fluid pressure cylinders 81 are provided such that rods 81a are directed upward. A base stage 72 is attached to upper ends of the rods 81a of the fluid pressure cylinders 81, and an electric motor 77 is provided on the base stage 72 such that a rotation axis 77a is directed upward.

The electric motor 77 is provided on the base stage 72 such that the rotation axis 77a extends coaxially with the rotation axis 26a of the electric motor 26. In addition, a rotation table 73 is attached to the rotation axis 77a so as to be rotatable in the horizontal plane. On the rotation table 73, a wire rod clip 74 that clips an end portion of the wire rod 16 delivered from the wire rod delivering member 31 is provided.

The wire rod clip 74 is attached in vicinity of an outer circumference of an upper surface of the rotation table 73, and the wire rod clip 74 is formed with a slit 74a into which the wire rod 16 can enter from the above. The slit 74a is formed so as to open at the upper end thereof, and a holding member (not shown) that holds the wire rod 16 that has entered the slit 74a is built into the wire rod clip 74.

An operating lever 75 for operating the holding member is provided on the wire rod clip 74. The operating lever 75 switches a holding state in which the wire rod 16 that has entered the slit 74a is held and a releasing state in which the wire rod 16 that has entered the slit 74a is not held and released. An actuator 76 for operating the operating lever 75 is provided on the lower table 23.

Figure 8:
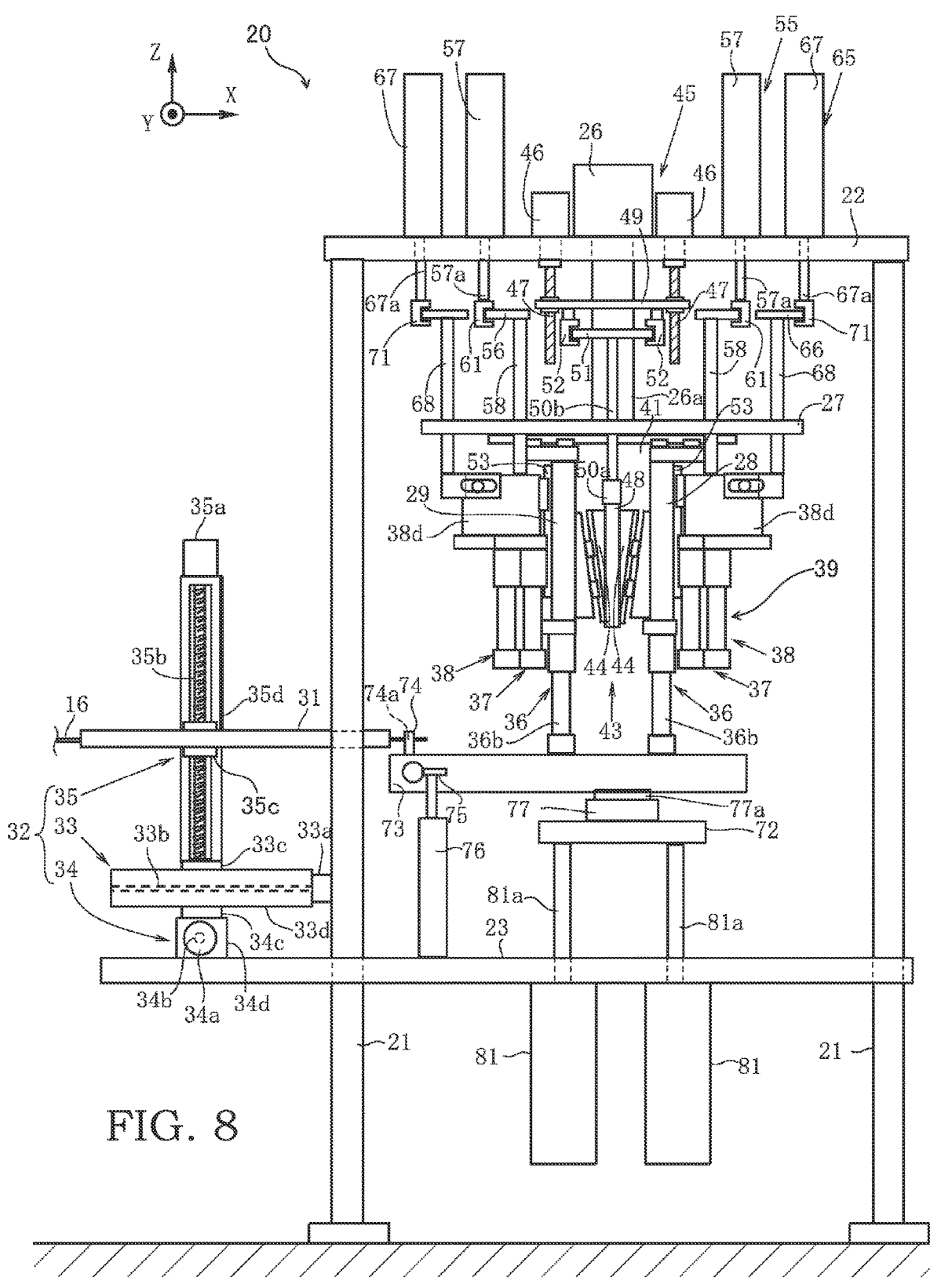
FIG. 8 is a front view of the wire winding device in this embodiment and shows a state at a beginning of winding in which an end portion of a wire rod is clipped by a wire rod clip.

Meanwhile, the fluid pressure cylinders 81 forms a table moving mechanism that can move the rotation table 73 upward and downward in the Z axis direction. The fluid pressure cylinders 81 can move the rotation table 73 upward and downward between an approached position at which the rotation table 73 is moved upward and the upper surface of the rotation table 73 is in contact with or in close proximity to the lower ends of the inner suspending pins 36b of the inner winding cores 36, as shown in FIG. 8, and a separated position at which gaps are formed between the lower ends of the inner suspending pins 36b and the upper surface of the rotation table 73, as shown in FIG. 7.

The electric motor 26 rotates the pair of columnar members 28 and 29, on which the winding cores 39 are provided, together with the rotary plate 27. In addition, the electric motor 77 rotates the rotation table 73, on which the wire rod clip 74 is provided, in synchronization with the pair of columnar members 28 and 29 that are rotated about the rotation center axis C of the rotary plate 27. By doing so, the wire winding device 20 is configured such that the wire rod 16 delivered from the wire rod delivering member 31 is wound around the winding cores 39 that are provided on the pair of columnar members 28 and 29 (see FIG. 9, FIGS. 10 and 11).

Meanwhile, as the winding cores 39 is rotated, the wire rod delivering member moving mechanism 32 moves the wire rod delivering member 31 in the direction of the rotation center axis C of the rotary plate 27. By doing so, by the wire rod delivering member moving mechanism 32, the wire rod 16 delivered from the wire rod delivering member 31 is wound spirally around the respective suspending pins 36b, 37b, and 38b of the winding cores 39 in the regular pattern.

Next, a wire winding method performed with the wire winding device 20 of this embodiment will be described.

The wire winding method of this embodiment is the wire winding method in which the wire winding is performed by using the device having: the rotary plate 27 that is rotationally driven by the electric motor 26 serving as the driving mechanism; the pair of columnar members 28 and 29 that are respectively provided on the rotary plate 27 so as to be movable along the straight line intersecting the rotation center axis C of the rotary plate 27; and the winding cores 39 that are respectively attached to the pair of columnar members 28 and 29. In the wire winding method of this embodiment, after the gap distance between the pair of columnar members 28 and 29 is adjusted, the pair of columnar members 28 and 29 are held such that the distances from the rotation center axis C of the rotary plate 27 to the pair of columnar members 28 and 29 become the same, and at the same time, the rotary plate 27 is rotated to wind the wire rod 16 around the winding cores 39 that are rotated together with the pair of columnar members 28 and 29.

In the following, a case in which the wire winding device 20 provided with the pair of movable columnar members 28 and 29 is used to form the stator coil 12, in which the inner coil 13, the intermediate coil 14, and the outer coil 15 are formed continuously as shown in FIG. 14, will be described. The operation of the wire winding is automatically controlled by a controller (not shown). The respective steps will be described below.

Preparation Step

A preparation step will be described first. In the preparation step, the wire rod 16 is delivered from the wire rod delivering member 31. Specifically, the wire rod 16 that is stored by being wound around the spool (not shown) is prepared, and the wire rod 16 is drawn out from the spool. The wire rod 16 that is stretched straight by the stretcher (not shown) is then inserted into the wire rod delivering member 31 and allowed to be bit by the biting mechanism (not shown).

Next, as shown in FIG. 8, the rotation table 73 is rotated by the electric motor 77 provided on the lower table 23, and the wire rod clip 74 attached in the vicinity of the outer circumference is opposed to the wire rod delivering member 31. The wire rod delivering member 31 is then moved by the wire rod delivering member moving mechanism 32, the end portion of the wire rod 16 projected out from the wire rod delivering member 31 is allowed to enter the slit 74a of the wire rod clip 74, and the wire rod 16 is held by the holding member (not shown) built into the slit 74a.

Gap Distance Holding Step

Next, a gap distance holding step will be described. In the gap distance holding step, the gap distance between the pair of columnar members 28 and 29 is adjusted, and the distance is held such that the respective distances from the rotation center axis C of the rotary plate 27 to the pair of columnar members 28 and 29 become the same. The adjustment and the holding of the gap distance is performed by the holding mechanism 43.

Specifically, as shown in FIG. 1, if the movable plate 48 is in a state in which it has been moved up, the control motors 46 of the holding mechanism 43 are driven to move the movable plate 48 downward in the vertical direction together with the pair of wedge members 44 and 44 as indicated by the solid arrow in FIG. 2. By doing so, the moving blocks 28a and 29a and the pair of columnar members 28 and 29 are moved in the radial direction of the rotary plate 27 along the inclination of the rails 44b as indicated by solid arrows in FIG. 2. Thus, the gap distance between the pair of columnar members 28 and 29 is increased. By doing so, the gap distance between the pair of columnar members 28 and 29 is set at a predetermined gap distance, and at the same time, the pair of columnar members 28 and 29 are positioned at the equidistant from the rotation center axis C of the rotary plate 27.

In the above, a predetermined gap distance is the required gap distance at which a resistance value of the stator coil 12 (see FIG. 14) formed by the wire rod 16, which has been prepared in the preparation step, falls within a range of a designed value, and is calculated based on the resistance value of the wire rod 16 in advance. By setting the gap distance between the pair of columnar members 28 and 29 at a predetermined gap distance, an overall length of the wire rod 16 wound around the stator coil 12 is adjusted, and as a result, the resistance value of the stator coil 12 is made to fall within the range of the designed value.

When the gap distance between the pair of columnar members 28 and 29 reaches a predetermined gap distance, the upward and downward movement of the movable plate 48 by the control motors 46 is stopped. The movement of the pair of columnar members 28 and 29 in the radial direction of the rotary plate 27 is stopped in turn. Thus, the respective distances from the pair of columnar members 28 and 29 to the rotation center axis C of the rotary plate 27 become the same, and the gap distance between the pair of columnar members 28 and 29 is held at a predetermined value.

In this state, as shown in FIG. 8, the rotation table 73 is moved upward by the fluid pressure cylinders 81 to cause the upper surface of the rotation table 73 to come into contact with lower end surfaces of the plurality of inner suspending pins 36b of the inner winding cores 36.

Wire Winding Step

Next, a wire winding step will be described. In the wire winding step, by the rotation of the rotary plate 27, the wire rod 16 is wound around the winding cores 36, 37, and 38 that are rotated together with the pair of columnar members 28 and 29. In this embodiment, because the above-described wire winding device 20 provided with the inner winding cores 36, the first outer winding cores 37, and the second outer winding cores 38 is used, the wire winding step includes an inner-winding step of winding the wire rod 16 around the inner winding cores 36, an intermediate-winding step of winding the wire rod 16 around the first outer winding cores 37, and an outer-winding step of winding the wire rod 16 around the second outer winding cores 38. These steps will be described below.

Inner-Winding Step

First, the inner-winding step will be described. In the inner-winding step, the wire rod 16 is wound around the inner winding cores 36. In order to achieve it, as shown in FIG. 8, the first outer winding cores 37 and the second outer winding cores 38 are moved upward and positioned above the inner winding cores 36. Specifically, in the first winding-core moving mechanism 55 and the second winding core moving mechanism 65, the rods 57a and 67a of the fluid pressure cylinders 57 and 67 are respectively pulled in and the first outer winding cores 37 and the second outer winding cores 38 are moved upward to the waiting position. By doing so, the outer side of the inner suspending pins 36b of the inner winding cores 36 in the rotation radial direction is opened.

Subsequently, the bitten wire rod 16 is released by the biting mechanism of the wire rod delivering member 31, and the electric motor 26 is driven to rotate the inner winding cores 36 together with the rotary plate 27 by a predetermined times. At the same time, the electric motor 77 provided on the lower table 23 is driven to rotate the rotation table 73, on which the wire rod clip 74 holding the end portion of the wire rod 16 is provided, by a predetermined times, in synchronization with the inner winding cores 36, in the same direction and at the same speed.

By doing so, as shown in FIG. 9, the wire rod 16 delivered from the wire rod delivering member 31 is wound around the inner winding cores 36 for a predetermined number of times. At this time, the wire rod delivering member moving mechanism 32 may move the wire rod delivering member 31 in the axial direction of the rotary plate 27 as the inner winding cores 36 are rotated. By doing so, the wire rod 16 delivered from the wire rod delivering member 31 is wound spirally around the plurality of inner suspending pins 36b so as to achieve the regular winding in which adjacent layers of the wound wire rod 16 are extending in parallel and in close contact with each other.

Subsequently to the formation of a first layer of the coil formed of the wire rod 16 directly suspended around the inner suspending pins 36b, as required, a second and further layers of the coil are formed by further performing the regular winding of the wire rod 16. As described above, as shown in FIG. 12, in the inner-winding step, the polygonal shaped inner coil 13 having: the coil end portions 13b formed of the wire rod 16 that is suspended around the inner suspending pins 36b provided on the inner base plates 36a; and the coil side portions 13a formed of the wire rod 16 that is suspended between the pair of columnar members 28 and 29 is formed.

Intermediate-Winding Step

Next, the intermediate-winding step will be described. In the intermediate-winding step, the intermediate coil 14 is formed by winding the wire rod 16 around the plurality of intermediate suspending pins 37b of the first outer winding cores 37. The inner coil 13 obtained in the previous step is surrounded by the plurality of intermediate suspending pins 37b of the first outer winding cores 37.

Specifically, as shown in FIG. 10, the first outer winding cores 37 are moved downward from the waiting position by pushing the rods 57a out from the fluid pressure cylinders 57 of the first winding-core moving mechanism 55. The plurality of intermediate suspending pins 37b of the first outer winding cores 37 are then moved to the winding position at the same level as those of the inner suspending pins 36b of the inner winding cores 36 (the position at which the inner suspending pins 36b are surrounded) in the direction of the rotation center axis C of the rotary plate 27.

At this time, the position of the wire rod delivering member 31 is adjusted by the wire rod delivering member moving mechanism 32 such that the wire rod 16 extending from the inner coil 13 towards the wire rod delivering member 31 enters a desired gap between the plurality of intermediate suspending pins 37b. By doing so, the wire rod 16 is guided from the inner coil 13 to the outer side of the plurality of intermediate suspending pins 37b.

Subsequently, the first outer winding cores 37 are rotated together with the inner winding cores 36, and the wire rod 16 delivered from the wire rod delivering member 31 is wound around the plurality of intermediate suspending pins 37b of the first outer winding cores 37 as shown in FIG. 13, and thereby, the intermediate coil 14 is formed.

In other words, as shown in FIG. 10, the electric motor 26, which has been halted, is driven again to further rotate the first outer winding cores 37 by a predetermined times together with the rotary plate 27 and the pair of columnar members 28 and 29. At the same time, the electric motor 77 provided on the lower table 23 is driven to rotate the rotation table 73, on which the wire rod clip 74 holding the end portion of the wire rod 16 is provided, by a predetermined times, in synchronization with the first outer winding cores 37 in the same direction and at the same speed. By doing so, the wire rod 16 delivered from the wire rod delivering member 31 is wound around the plurality of intermediate suspending pins 37b of the first outer winding cores 37 for a predetermined number of times.

At this time, the wire rod delivering member moving mechanism 32 may move the wire rod delivering member 31 in the axial direction of the rotary plate 27 as the first outer winding cores 37 are rotated. By doing so, the wire rod 16 delivered from the wire rod delivering member 31 is wound spirally around the plurality of intermediate suspending pins 37b so as to achieve the regular winding in which adjacent layers of the wound wire rod 16 are extending in parallel and in close contact with each other. Subsequently to the formation of the first layer of the coil formed of the wire rod 16 directly suspended around the intermediate suspending pins 37b, as required, a second and further layers of the coil are formed by further performing the regular winding of the wire rod 16.

As described above, as shown in FIG. 13, in the intermediate-winding step, the polygonal shaped intermediate coil 14 having: coil end portions 14b formed of the wire rod 16 that is suspended around the intermediate suspending pins 37b provided on the intermediate base plates 37a; and the coil side portions 14a formed of the wire rod 16 that is suspended between the pair of columnar members 28 and 29 is formed.

Outer-Winding Step

Next, the outer-winding step will be described. In the outer-winding step, the outer coil 15 is formed by winding the wire rod 16 around the plurality of outer suspending pins 38b of the second outer winding cores 38. The intermediate coil 14 obtained in the previous step is surrounded by the plurality of outer suspending pins 38b of the second outer winding cores 38.

Specifically, as shown in FIG. 11, the second outer winding cores 38 are moved downward from the waiting position shown in FIG. 7 by pushing the rods 67a out from the fluid pressure cylinders 67 of the second winding core moving mechanism 65. The plurality of outer suspending pins 38b are then moved to the winding position at the same level as those of the intermediate suspending pins 37b of the first outer winding cores 37 (the position at which the intermediate suspending pins 37b are surrounded) in the direction of the rotation center axis C of the rotary plate 27.

At this time, the position of the wire rod delivering member 31 is adjusted by the wire rod delivering member moving mechanism 32 such that the wire rod 16 extending from the intermediate coil 14 towards the wire rod delivering member 31 enters a desired gap between the plurality of outer suspending pins 38b. By doing so, the wire rod 16 is guided from the intermediate coil 14 to the outer side of the plurality of outer suspending pins 38b.

Subsequently, the second outer winding cores 38 are rotated together with the first outer winding cores 37, and the wire rod 16 delivered from the wire rod delivering member 31 is wound around the plurality of outer suspending pins 38b of the second outer winding cores 38, and thereby, the outer coil 15.

In other words, as shown in FIG. 11, the electric motor 26, which has been halted, is driven again to further rotate the second outer winding cores 38 by a predetermined times. At the same time, the rotation table 73, on which the wire rod clip 74 holding the end portion of the wire rod 16 is provided, is rotated by a predetermined times, in synchronization with the second outer winding cores 38 in the same direction and at the same speed. By doing so, the wire rod 16 delivered from the wire rod delivering member 31 is wound around the plurality of outer suspending pins 38b of the second outer winding cores 38 for a predetermined number of times.

At this time, the wire rod delivering member moving mechanism 32 may move the wire rod delivering member 31 in the axial direction of the rotary plate 27 as the second outer winding cores 38 are rotated. By doing so, the wire rod 16 delivered from the wire rod delivering member 31 is wound spirally around the plurality of outer suspending pins 38b so as to achieve the regular winding in which adjacent layers of the wound wire rod 16 are extending in parallel and in close contact with each other. Subsequently to the formation of the first layer of the coil formed of the wire rod 16 directly suspended around the outer suspending pins 38b, as required, a second and further layers of the coil are formed by further performing the regular winding of the wire rod 16.

As described above, as shown in FIG. 14, in the outer-winding step, the polygonal shaped outer coil 15 having: coil end portions 15b formed of the wire rod 16 that is suspended around the outer suspending pins 38b provided on the outer base plates 38a; and the coil side portions 15a formed of the wire rod 16 that is suspended between the pair of columnar members 28 and 29 is formed.

In the above, as shown in FIG. 14, the outer suspending pins 38b of the second outer winding cores 38 are positioned at the positions surrounding the coil end portions 14b of the intermediate coil 14 from the radially outer side, and the intermediate suspending pins 37b of the first outer winding cores 37 are positioned at the positions surrounding the coil end portions 13b of the inner coil 13 from the radially outer side. Thus, the outer coil 15 has a size that can surround the intermediate coil 14 from the radially outer side with a predetermined gap, and the intermediate coil 14 has a size that can surround the inner coil 13 from the radially outer side with a predetermined gap.

As a result, the size of the inner coil 13, the size of the intermediate coil 14, and the size of the outer coil 15 are different from each other. Thus, with the wire winding device 20 in this embodiment, it is possible to form the stator coil 12 in which the lengths of the coil end portions 13*b*, 14*b*, and 15*b* are different and the inner-, the intermediate-, and the outer coils 13, 14, and 15 are formed continuously.

In the above, the resistance value of the stator coil 12 needs to fall within the range of the designed value set in advance. In the wire winding device 20 and the wire winding method in this embodiment, the pair of columnar members 28 and 29, to which the winding cores 39 are attached by being divided, are respectively provided so as to be movable along the straight line intersecting the rotation center axis C of the rotary plate 27. Therefore, it is possible to adjust the resistance value of the stator coil 12 by adjusting the gap distance between the pair of columnar member 28 and 29. In addition, it is possible to change the length of the wire rod 16 to be wound around the winding cores 39, which are provided in a divided manner, without exchanging the winding cores 39.

In addition, the holding mechanism 43 holds the respective distances from the rotation center axis C of the rotary plate 27 to the pair of columnar members 28 and 29 such that they become the same with each other. Therefore, it is possible to match the rotation center of the winding cores 39, which are provided in a divided manner, with the rotation center axis C of the rotary plate 27. Thus, wobbling caused during the rotation due to the decentering of the winding cores 39 is suppressed, and therefore, it is possible to perform the wire winding of the wire rod 16 rapidly.

After the inner coil 13, the intermediate coil 14, and the outer coil 15 are formed, these coils are removed from the inner winding cores 36, the first outer winding cores 37, and the second outer winding cores 38 and carried away. In a subsequent step, the coil side portions 13*a*, 14*a*, and 15*a* are inserted to the slots of a core (not shown) by using the conventionally used inserter method.

A procedure for removing the inner coil 13, the intermediate coil 14, and the outer coil 15 from the inner winding cores 36, the first outer winding cores 37, and the second outer winding cores 38 will be described. The wire rod 16 is first caused to be bit by the biting mechanism (not shown) of the wire rod delivering member 31 such that further delivery of the wire rod 16 from the wire rod delivering member 31 is prohibited.

The inner coil 13, the intermediate coil 14, and the outer coil 15 respectively formed around the inner winding cores 36, the first outer winding cores 37, and the second outer winding cores 38 are then held by a shape maintaining tool (not shown), and the wire rod 16 extending from the wire rod delivering member to the outer coil 15 is cut by a cutter, etc. in a state in which the shape thereof is maintained. By doing so, the inner coil 13, the intermediate coil 14, and the outer coil 15 are separated away from the wire rod delivering member 31.

At this time, the wire rod 16 forming the inner coil 13, the intermediate coil 14, or the outer coil 15 may be bundled with an adhesive tape as required. By doing so, it is possible to bundle the wire rod 16 floating between the suspending pins 36*b*, 37*b*, and 38*b*.

In addition, the rotation table 73 is moved downward by the fluid pressure cylinders 81, and thereby, the lower end surfaces of the inner suspending pins 36*b*, the intermediate suspending pins 37*b*, and the outer suspending pins 38*b* is released. Subsequently, the gap distance between the pair of columnar members 28 and 29 is reduced by the holding mechanism 43.

Specifically, as indicated by a broken arrow in FIG. 2, the control motors 46 of the holding mechanism 43 are driven to move the movable plate 48 upward in the vertical direction together with the pair of wedge members 44 and 44. By doing so, the moving blocks 28*a* and 29*a* are moved along the inclination of the rails 44*b*, and the pair of columnar members 28 and 29 are moved in the radial direction of the rotary plate 27. By doing so, the gap distance between the pair of columnar members 28 and 29 is reduced.

In addition, by reducing the gap distance between the pair of columnar members 28 and 29 by the holding mechanism 43, the suspending pins 36*b*, 37*b*, and 38*b* of the winding cores 39 are caused to approach each other.

By doing so, as shown in FIG. 14, the tension is reduced from the inner coil 13, the intermediate coil 14, and the outer coil 15 respectively formed of the wire rod 16 suspended around the inner suspending pins 36*b*, the intermediate suspending pins 37*b*, and the outer suspending pins 38*b*. The wire rod 16 is then removed away from the inner suspending pins 36*b*, the intermediate suspending pins 37*b*, and the outer suspending pins 38*b*.

Subsequently, the inner coil 13, the intermediate coil 14, and the outer coil 15 held by the shape maintaining tool (not shown) are moved downward together with the shape maintaining tool, and thereby, they are removed downward from the opened lower end surfaces of the inner suspending pins 36*b*, the intermediate suspending pins 37*b*, and the outer suspending pins 38*b*.

After the inner coil 13, the intermediate coil 14, and the outer coil 15 are removed from the inner winding cores 36, the first outer winding cores 37, and the second outer winding cores 38, it is possible to restart the gap distance holding step described above. Thus, it is possible to improve a productivity.

In the above-mentioned embodiment, although a description has been given of a case in which the wire rod delivering member 31 is a member that allows passage of a single wire rod 16, the wire rod delivering member 31 may allow passage of the plurality of wire rods 16 that are in close contact in parallel. In a case in which the wire rod delivering member 31 delivers the plurality of wire rods 16, it is preferable to use the rod-shaped member formed with an elongated hole that allows passage of the plurality of wire rods 16.

In addition, in the above-mentioned embodiment, a description has been given of a case in which as the winding cores that are attached to the pair of columnar members 28 and 29 in a divided manner, the cores formed of the inner winding cores 36, the first outer winding cores 37, and the second outer winding cores 38 are used, and the inner coil 13, the intermediate coil 14, and the outer coil 15 are formed in a continuous manner. However, although not illustrated, in a case in which a single coil is to be obtained, a single winding core may be attached to the pair of columnar members 28 and 29 in a divided manner, or in a case in which a coil, in which two coils (i.e., the inner coil 13 and the outer coil 15) are formed continuously, is to be obtained, the inner winding cores 36 and the one of the first outer winding cores 37 and the second outer winding cores 38 may be attached to the pair of columnar members 28 and 29 in a divided manner, and the other of the first outer winding cores 37 and the second outer winding cores 38 may not be attached.

In addition, in the above-mentioned embodiment, a description has been given of a case in which the wedge members 44 respectively have the triangle plates 44a that are provided on the movable plate 48 so as to extend in the moving direction. However, although not illustrated, as long as the wedge members 44 have the inclined surfaces facing the columnar members 28 and 29, the wedge members 44 may not have the triangle plates 44a, and the wedge members 44 may have, instead of the triangle plates 44a, trapezoidal plates, etc. that are provided on the movable plate 48 so as to extend in the moving direction. In a case in which the trapezoidal plates are to be used, it is possible to provide the rails 44b on the inclined surfaces of the trapezoidal plates facing the columnar members.

Furthermore, in the above-mentioned embodiment, a description has been given of a case in which two suspending pins 36b, 37b, and 38b are respectively provided on the inner-, the intermediate-, and the outer base plates 36a, 37a, and 38a so as to be erected thereon, and the inner-, the intermediate-, and the outer coils 13, 14, and 15 having the rectangular shape are formed by the wire rod 16 that is suspended around total of four suspending pins 36b, 37b, and 38b.

However, as long as the coils 13, 14, and 15 having the required shape can be formed, the number of suspending pins 36b, 37b, and 38b is not limited to four, and total of six suspending pins may be provided on the base plate in order to obtain a hexagonal coil. In addition, total of eight suspending pins may also be provided on the base plate in order to obtain an octagonal coil. In addition, more than eight suspending pins may also be provided on each base plate.

Embodiments of the present invention were described above, but the above embodiments are merely examples of applications of the present invention, and the technical scope of the present invention is not limited to the specific constitutions of the above embodiments.

With respect to the above description, the contents of application No. 2020-118466, with a filing date of Jul. 9, 2020 in Japan, are incorporated herein by reference.

The invention claimed is:

1. A wire winding device for winding a wire rod around a rotating winding core comprising:
  a rotary plate rotationally driven by a driving mechanism;
  a pair of columnar members provided on the rotary plate such that a rotation center axis of the rotary plate is positioned between the columnar members;
  the winding core respectively attached to the pair of columnar members; and
  a holding mechanism capable of changing and holding a gap distance between the pair of columnar members, wherein the holding mechanism has:
    a movable plate provided on the rotation center axis of the rotary plate, the movable plate being movable along a direction of the rotation center axis of the rotary plate;
    a pair of wedge members having inclined surfaces facing the pair of columnar members, the pair of wedge members being provided on both side surfaces of the movable plate such that the rotation center axis of the rotary plate is positioned between the pair of wedge members; and a wedge moving mechanism configured to move the pair of wedge members together with the movable plate along the direction of the rotation center axis of the rotary plate,
  the pair of columnar members are respectively provided on the rotary plate so as to be movable along a straight line, the straight line extending orthogonal to the rotation center axis of the rotary plate, and
  respective distances from the rotation center axis of the rotary plate to the pair of columnar members are held by the holding mechanism so as to become the same.

2. The wire winding device according to claim 1, wherein the pair of wedge members each has:
  an inclined member having the inclined surface; and
  a rail provided on the inclined surface, and
  the pair of columnar members respectively have follower members, the follower members being configured to move along an extending direction of the rail.

3. The wire winding device according to claim 1, wherein the wedge moving mechanism has:
  a control motor having a rotation axis, the rotation axis being provided with an external thread portion; and
  a control member linked to the movable plate by being threaded to the external thread portion, and
  the pair of wedge members are movable together with the movable plate along the direction of the rotation center axis of the rotary plate, the pair of wedge members are moved as the control member is moved in response to rotation of the control motor.

4. The wire winding device according to claim 1, wherein the winding core has:
  inner winding cores respectively attached to tip ends of the pair of columnar members; and
  outer winding cores respectively attached to the pair of columnar members so as to be movable along a direction of the rotation center axis of the rotary plate, the outer winding cores being arranged on radially outer side of the inner winding core, and
  the wire winding device further comprising
  a winding core moving mechanism capable of reciprocatingly moving positions of the outer winding cores in the direction of the rotation center axis of the rotary plate between a winding position and a waiting position,
  the winding position being located at a same level as positions of the inner winding cores, the winding position enabling winding of the wire rod; and
  the waiting position being located at a level deviated from the positions of the inner winding cores, the waiting position prohibiting the winding of the wire rod.

5. A wire winding method for performing a wire winding by using a device having:
  a rotary plate rotationally driven by a driving mechanism;
  a pair of columnar members respectively provided on the rotary plate so as to be movable along a straight line, the straight line extending orthogonal to a rotation center axis of the rotary plate;
  winding cores respectively attached to the pair of columnar members; and
  a holding mechanism configured to change and hold respective distances from the rotation center axis of the rotary plate to the pair of columnar members, the holding mechanism having:
    a movable plate provided on the rotation center axis of the rotary plate, the movable plate being movable along a direction of the rotation center axis of the rotary plate, a pair of wedge members having inclined surfaces facing the pair of columnar members, the pair of wedge members being provided on both side surfaces of the movable plate such that the rotation center axis of the rotary plate is positioned between the pair of wedge members, and a wedge moving mechanism configured to move the pair of wedge members together with the movable plate along the direction of the rotation center axis of the rotary plate;

the method comprising:

a step of adjusting a gap distance between the pair of columnar members, and a subsequent step of, while holding respective distances from the rotation center axis of the rotary plate to the pair of columnar members so as to become same with each other by the holding mechanism, winding a wire rod around the winding cores by rotating the rotary plate, the winding cores being rotated together with the pair of columnar members.

\* \* \* \* \*